US012194602B2

(12) United States Patent
Ogiso et al.

(10) Patent No.: US 12,194,602 B2
(45) Date of Patent: Jan. 14, 2025

(54) ELECTRIC WORK MACHINE

(71) Applicant: MAKITA CORPORATION, Anjo (JP)

(72) Inventors: Yutaka Ogiso, Anjo (JP); Makoto Chikaraishi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/239,959

(22) Filed: Aug. 30, 2023

(65) Prior Publication Data

US 2024/0123585 A1 Apr. 18, 2024

(30) Foreign Application Priority Data

Oct. 18, 2022 (JP) ................................ 2022-167172

(51) Int. Cl.
*B25B 23/18* (2006.01)
*B25B 21/02* (2006.01)

(52) U.S. Cl.
CPC ............. *B25B 23/18* (2013.01); *B25B 21/02* (2013.01)

(58) Field of Classification Search
CPC ................................ B25B 21/02; B25B 23/18
See application file for complete search history.

(56) References Cited

U.S. PATENT DOCUMENTS

| | | | | |
|---|---|---|---|---|
| 7,726,863 B2 * | 6/2010 | Brandstaetter | A61B 1/0676 | 362/399 |
| 8,328,381 B2 * | 12/2012 | Dixon | B25F 5/021 | 362/120 |
| 10,207,380 B2 * | 2/2019 | Billings | F21V 23/0471 | |
| 11,453,106 B2 * | 9/2022 | Kelly | B25F 5/021 | |
| 11,919,129 B2 * | 3/2024 | Huber | B25B 23/1475 | |
| 2013/0021783 A1 * | 1/2013 | Vanko | B25B 21/00 | 362/119 |
| 2016/0354889 A1 | 12/2016 | Ely et al. | | |
| 2017/0106523 A1 * | 4/2017 | Pan | F21V 33/0084 | |

* cited by examiner

*Primary Examiner* — Arman B Fallahkhair
(74) *Attorney, Agent, or Firm* — Oliff PLC

(57) ABSTRACT

A light unit is less likely to have lower light emission performance upon receiving a shock. An electric work machine includes a motor, a housing including a motor compartment accommodating the motor and a grip protruding downward from the motor compartment, an output unit located frontward from the motor and operable with a rotational force from the motor, a substrate extending above, on a left, and on a right of the output unit, and a plurality of light emitters mounted on a front surface of the substrate at intervals in a circumferential direction of the output unit. A light emitter of the plurality of light emitters nearest an apex of the substrate immediately above the output unit is at a position shifted circumferentially by a predetermined angle from the apex.

17 Claims, 18 Drawing Sheets

ELECTRIC WORK MACHINE

CROSS-REFERENCE TO RELATED APPLICATIONS

This application claims the benefit of priority to Japanese Patent Application No. 2022-167172, filed on Oct. 18, 2022, the entire contents of which are hereby incorporated by reference.

BACKGROUND

1. Technical Field

The present disclosure relates to an electric work machine.

2. Description of the Background

In the technical field of electric work machines, a lighting system for a power tool is known as described in U.S. Patent Application Publication No. 2016/0354889 (hereafter, Patent Literature 1).

BRIEF SUMMARY

The lighting systems for power tools described in Patent Literature 1 include one or more chip-on-board light-emitting diodes (COB LEDs) as light units. When, for example, an electric work machine including a light unit falls and the light unit receives a shock, the light unit may have lower light emission performance.

One or more aspects of the present disclosure are directed to reducing the likelihood of a light unit having lower light emission performance upon receiving a shock.

A first aspect of the present disclosure provides an electric work machine, including:

- a motor;
- a housing including
  - a motor compartment accommodating the motor, and
  - a grip protruding downward from the motor compartment;
- an output unit located frontward from the motor and operable with a rotational force from the motor;
- a substrate extending above, on a left, and on a right of the output unit; and
- a plurality of light emitters mounted on a front surface of the substrate at intervals in a circumferential direction of the output unit,
- wherein a light emitter of the plurality of light emitters nearest an apex of the substrate immediately above the output unit is at a position shifted circumferentially by a predetermined angle from the apex.

A second aspect of the present disclosure provides an electric work machine, including:

- a motor including
  - a stator, and
  - a rotor rotatable relative to the stator;
- a housing including
  - a motor compartment accommodating the motor, and
  - a grip extending vertically;
- a forward-reverse switch lever operable to switch a rotation direction of the motor between forward and reverse;
- a trigger lever located in an upper portion of the grip and operable to switch the motor between a driving state and a stopped state;
- a pinion gear rotatable by the rotor;
- a reducer connected to the pinion gear;
- an output unit operable with the reducer;
- a substrate located at least above the output unit; and
- a plurality of light emitters mounted on a front surface of the substrate at intervals in a circumferential direction of the output unit,
- wherein a light emitter of the plurality of light emitters nearest an apex of the substrate immediately above the output unit is at a position shifted circumferentially by a predetermined angle from the apex.

The technique according to the above aspects of the present disclosure reduces the likelihood of a light unit having lower light emission performance upon receiving a shock.

DETAILED DESCRIPTION

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an electric work machine.

Electric Work Machine

Figure 1:
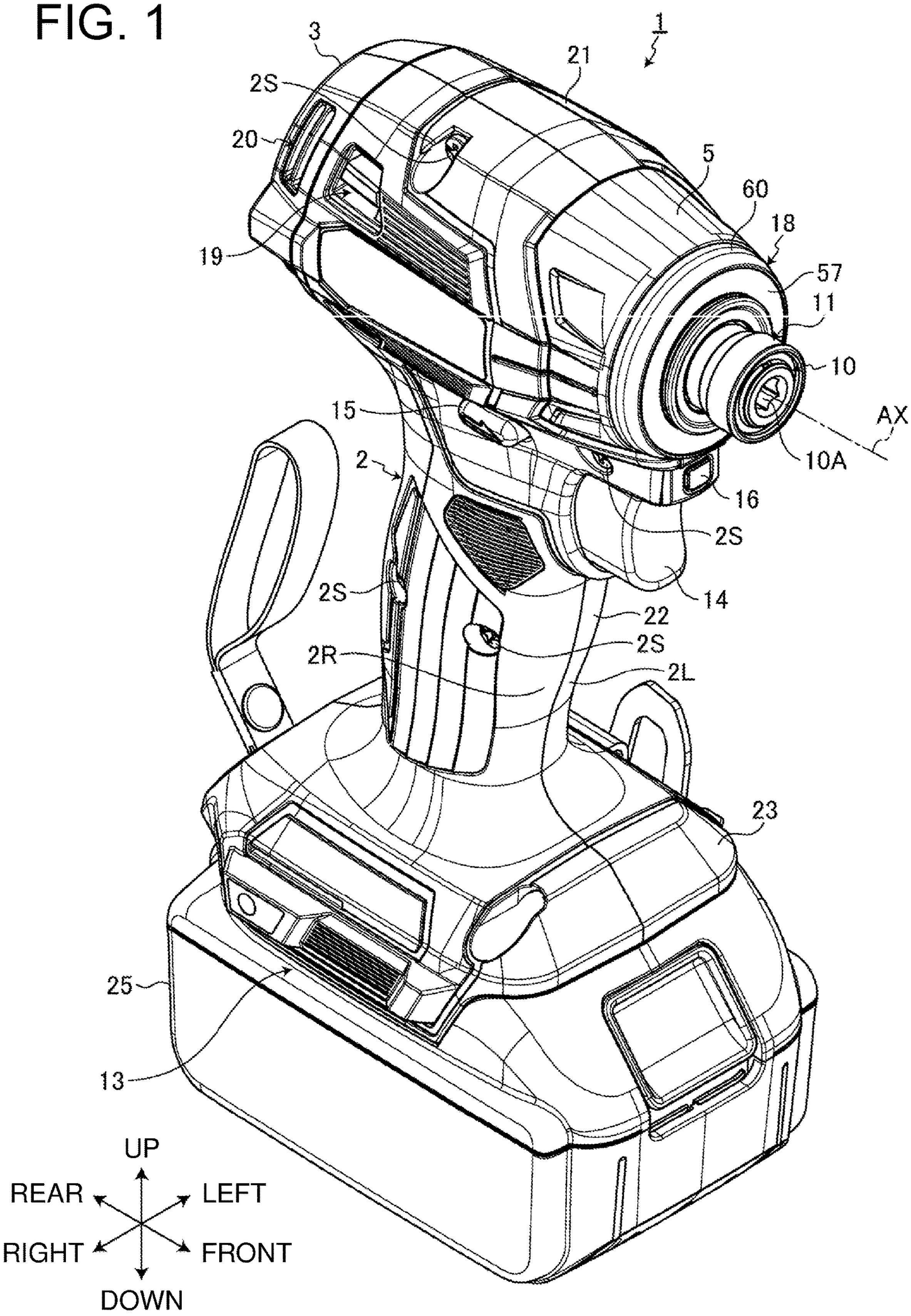
FIG. 1 is a perspective view of an electric work machine according to an embodiment as viewed from the front.
Figure 2:
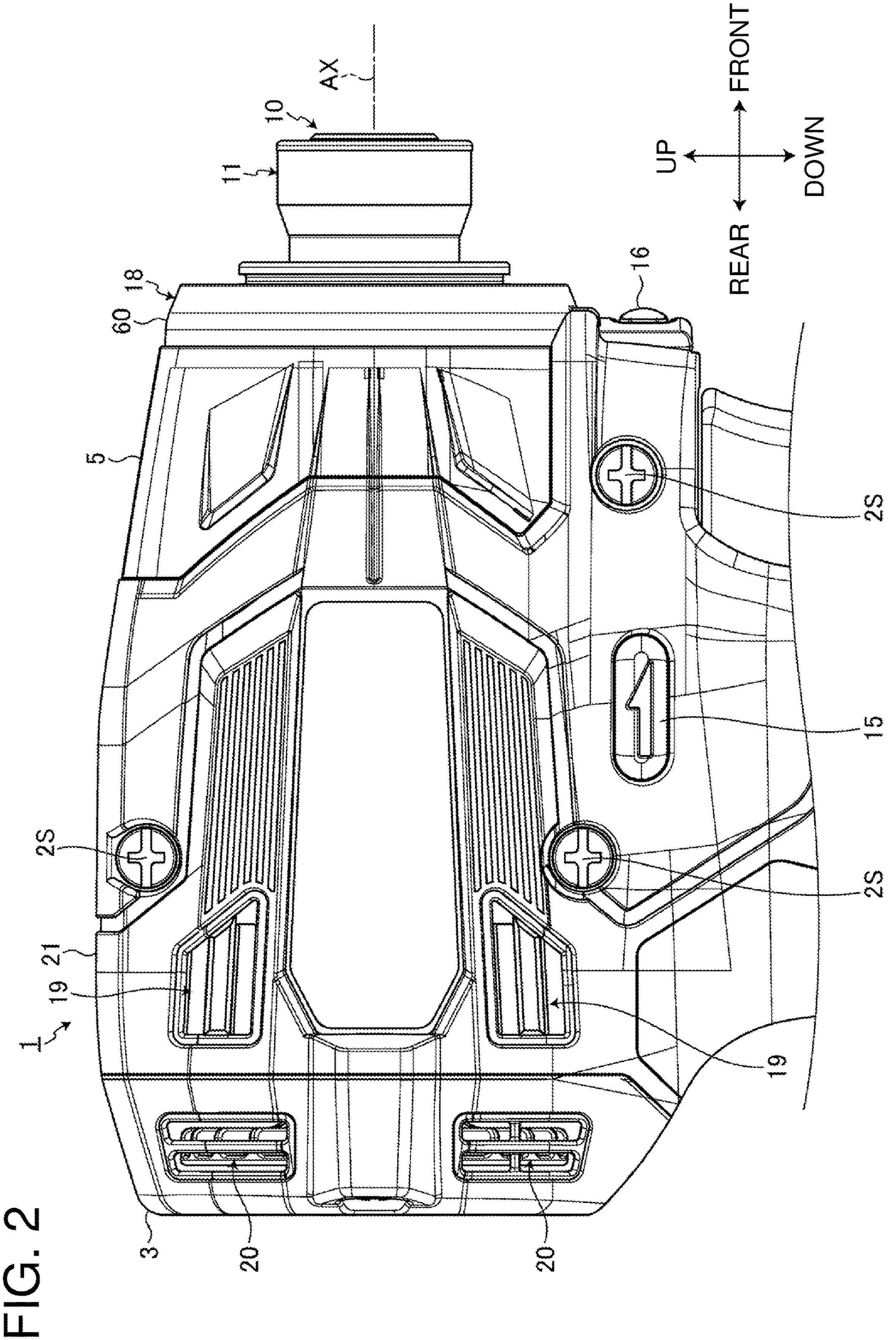
FIG. 2 is a side view of an upper portion of the electric work machine according to the embodiment.
Figure 3:
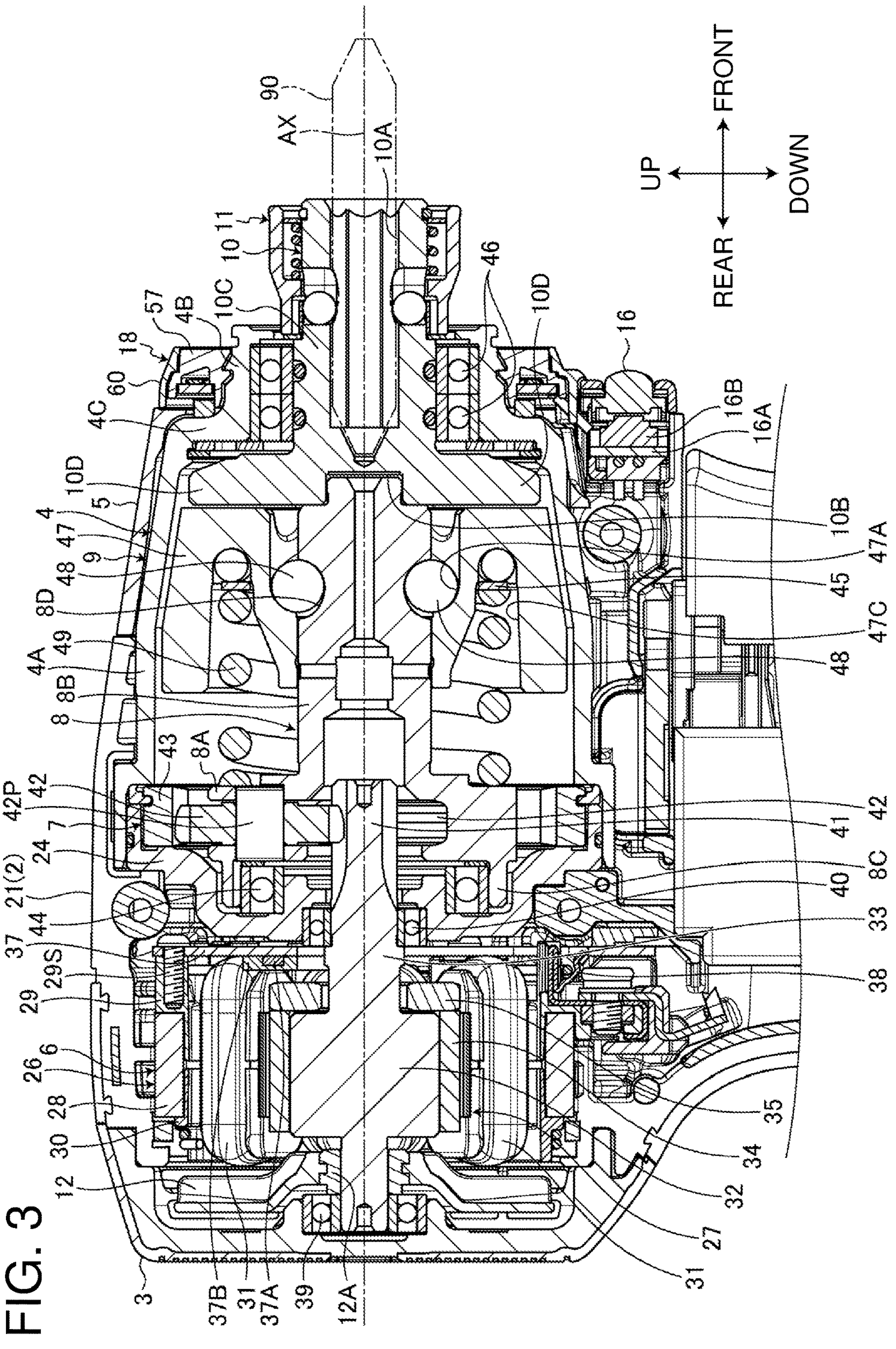
FIG. 3 is a longitudinal sectional view of the upper portion of the electric work machine according to the embodiment.
Figure 4:
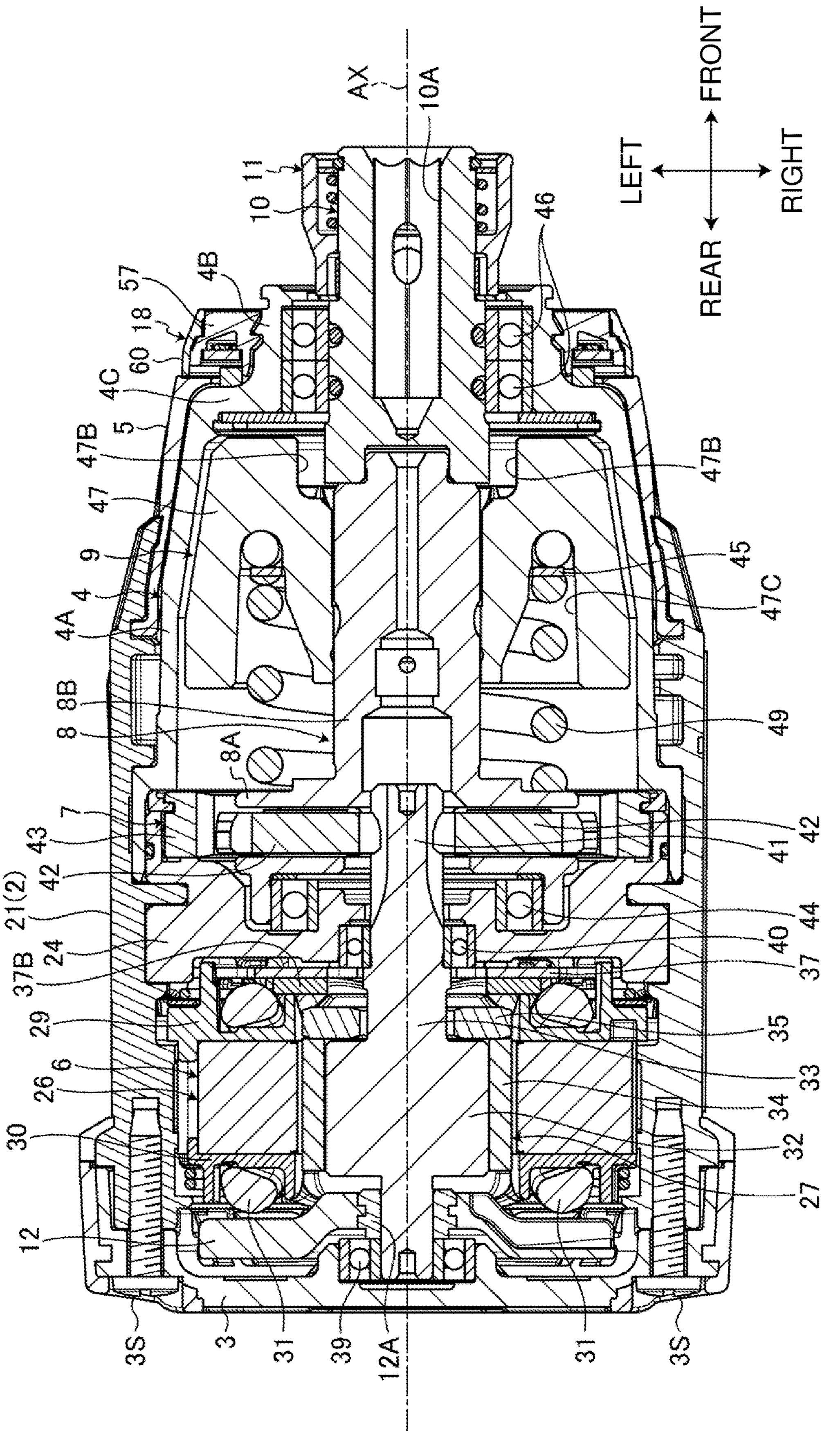
FIG. 4 is a horizontal sectional view of the upper portion of the electric work machine according to the embodiment.

FIG. 1 is a perspective view of an electric work machine 1 according to an embodiment as viewed from the front. FIG. 2 is a side view of an upper portion of the electric work machine 1. FIG. 3 is a longitudinal sectional view of the upper portion of the electric work machine 1. FIG. 4 is a horizontal sectional view of the upper portion of the electric work machine 1.

The electric work machine 1 according to the present embodiment is a power tool including an electric motor 6 as a power source. A direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience. The rotation axis AX in the present embodiment extends in the front-rear direction. A first axial direction is from the rear to the front. A second axial direction is from the front to the rear.

The electric work machine 1 according to the present embodiment is an impact tool as an example of a power tool. The electric work machine 1 is hereafter referred to as an impact tool 1 as appropriate.

The impact tool 1 according to the present embodiment is an impact driver as an example of a screwing tool. The impact tool 1 includes a housing 2, a rear cover 3, a hammer case 4, a case cover 5, the motor 6, a reducer 7, a spindle 8, a striker 9, an anvil 10, a tool holder 11, a fan 12, a battery mount 13, a trigger lever 14, a forward-reverse switch lever 15, a hand mode switch button 16, and a light unit 18.

The housing 2 is formed from a synthetic resin. The housing 2 in the present embodiment is formed from nylon. The housing 2 includes a left housing 2L and a right housing 2R. The right housing 2R is located on the right of the left housing 2L. The left housing 2L and the right housing 2R are fastened together with multiple screws 2S. The housing 2 includes a pair of housing halves.

The housing 2 includes a motor compartment 21, a grip 22, and a battery holder 23.

The motor compartment 21 is cylindrical. The motor compartment 21 accommodates the motor 6, a part of a bearing box 24, and a rear portion of the hammer case 4.

The grip 22 protrudes downward from the motor compartment 21. The trigger lever 14 is located in an upper portion of the grip 22. The grip 22 is grippable by an operator.

The battery holder 23 is connected to the lower end of the grip 22. The battery holder 23 has larger outer dimensions than the grip 22 in the front-rear direction and in the lateral direction.

The rear cover 3 is formed from a synthetic resin. The rear cover 3 is located at the rear of the motor compartment 21. The rear cover 3 accommodates at least a part of the fan 12. The fan 12 is located circumferentially inward from the rear cover 3. The rear cover 3 covers an opening at the rear end of the motor compartment 21. The rear cover 3 is fastened to the rear end of the motor compartment 21 with screws 3S.

The motor compartment 21 has inlets 19. The rear cover 3 has outlets 20. Air outside the housing 2 flows into an internal space of the housing 2 through the inlets 19, and then flows out of the housing 2 through the outlets 20.

The hammer case 4 serves as a gear case accommodating the reducer 7. The hammer case 4 accommodates the reducer 7, the spindle 8, the striker 9, and at least a part of the anvil 10. The hammer case 4 is formed from a metal. The hammer case 4 in the present embodiment is formed from aluminum. The hammer case 4 is cylindrical.

The hammer case 4 includes a rear cylinder 4A, a front cylinder 4B, and an annular portion 4C. The front cylinder 4B is located frontward from the rear cylinder 4A. The rear cylinder 4A has a larger outer diameter than the front cylinder 4B. The rear cylinder 4A has a larger inner diameter than the front cylinder 4B. The annular portion 4C connects the front end of the rear cylinder 4A and the rear end of the front cylinder 4B.

The hammer case 4 is connected to the front of the motor compartment 21. The bearing box 24 is fastened to a rear portion of the rear cylinder 4A. The reducer 7 is at least partially located inside the bearing box 24. The bearing box 24 includes threads on its outer circumference. The rear cylinder 4A has threaded grooves on the inner circumference of the rear portion. The threads on the bearing box 24 are engaged with the threaded grooves on the rear cylinder 4A to fasten the bearing box 24 and the hammer case 4 together. The hammer case 4 is held between the left housing 2L and the right housing 2R. A part of the bearing box 24 and the rear portion of the rear cylinder 4A are accommodated in the motor compartment 21. The bearing box 24 is fixed to the motor compartment 21 and the hammer case 4.

The case cover 5 covers at least a part of the surface of the hammer case 4. The case cover 5 in the present embodiment covers the surface of the rear cylinder 4A. The case cover 5 is formed from a synthetic resin. The case cover 5 in the present embodiment is formed from a polycarbonate resin. The case cover 5 protects the hammer case 4. The case cover 5 prevents contact between the hammer case 4 and objects around the impact tool 1. The case cover 5 prevents contact between the operator and the hammer case 4.

The motor 6 is a power source for the impact tool 1. The motor 6 generates a rotational force. The motor 6 is an electric motor. The motor 6 is an inner-rotor brushless motor. The motor 6 includes a stator 26 and a rotor 27. The stator 26 is supported on the motor compartment 21. The rotor 27 is at least partially located inward from the stator 26. The rotor 27 rotates relative to the stator 26. The rotor 27 rotates about the rotation axis AX extending in the front-rear direction.

The stator 26 includes a stator core 28, a front insulator 29, a rear insulator 30, and multiple coils 31.

The stator core 28 is located radially outward from the rotor 27. The stator core 28 includes multiple steel plates stacked on one another. The steel plates are metal plates formed from iron as a main component. The stator core 28 is cylindrical. The stator core 28 includes multiple teeth to support the coils 31.

The front insulator 29 is located on the front of the stator core 28. The rear insulator is located on the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 in between. The coils 31 surround the teeth on the stator core 28 with the front insulator 29 and the rear insulator 30 in between. The coils 31 and the stator core 28 are electrically insulated from each other with the front insulator 29 and the rear insulator 30. The coils 31 are connected to one another with fusing terminals 38.

The rotor 27 rotates about the rotation axis AX. The rotor 27 includes a rotor core 32, a rotor shaft 33, a rotor magnet 34, and a sensor magnet 35.

The rotor core 32 and the rotor shaft 33 are formed from steel. In the present embodiment, the rotor core 32 and the rotor shaft 33 are integral with each other. The rotor shaft 33 includes a front portion protruding frontward from the front end face of the rotor core 32. The rotor shaft 33 includes a rear portion protruding rearward from the rear end face of the rotor core 32.

The rotor magnet 34 is fixed to the rotor core 32. The rotor magnet 34 is cylindrical. The rotor magnet 34 surrounds the rotor core 32.

The sensor magnet 35 is fixed to the rotor core 32. The sensor magnet 35 is annular. The sensor magnet 35 is located on the front end face of the rotor core 32 and the front end face of the rotor magnet 34.

A sensor board 37 is attached to the front insulator 29. The sensor board 37 is fastened to the front insulator 29 with a screw 29S. The sensor board 37 includes an annular circuit board, a magnetic sensor 37A, and a resin-molded body 37B. The magnetic sensor 37A is supported on the circuit board. The resin-molded body 37B covers the magnetic sensor 37A. The sensor board 37 at least partially faces the sensor magnet 35. The magnetic sensor 37A detects the position of the sensor magnet 35 to detect the position of the rotor 27 in the rotation direction.

The rotor shaft 33 includes the rear portion rotatably supported by a rotor bearing 39. The rotor bearing 39 includes a front portion rotatably supported by a rotor bearing 40. The rotor bearing 39 is held by the rear cover 3. The rotor bearing 40 is held by the bearing box 24. The front end of the rotor shaft 33 is located in an internal space of the hammer case 4 through an opening in the bearing box 24.

The rotor shaft 33 receives a pinion gear 41 on the front end. The pinion gear 41 is connected to at least a part of the reducer 7. The rotor shaft 33 is connected to the reducer 7 with the pinion gear 41.

The reducer 7 transmits a rotational force from the motor 6 to the spindle 8 and the anvil 10. The reducer 7 is accommodated in the rear cylinder 4A in the hammer case 4. The reducer 7 includes multiple gears. The reducer 7 is located frontward from the motor 6. The reducer 7 connects the rotor shaft 33 and the spindle 8 together. The rotor 27 drives the gears in the reducer 7. The reducer 7 transmits rotation of the rotor 27 to the spindle 8. The reducer 7 rotates the spindle 8 at a lower rotational speed than the rotor shaft 33. The reducer 7 includes a planetary gear assembly.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4 and the bearing box 24. Each planetary gear 42 meshes with the pinion gear 41. The planetary gears 42 are rotatably supported by the spindle 8 with a pin 42P. The spindle 8 is rotated by the planetary gears 42. The internal gear 43 includes internal teeth that mesh with the planetary gears 42. The internal gear 43 is fixed to the bearing box 24. The internal gear 43 is constantly nonrotatable relative to the bearing box 24.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P in between, thus rotates at a lower rotational speed than the rotor shaft 33.

The spindle 8 rotates with a rotational force from the motor 6. The spindle 8 is located frontward from at least a part of the motor 6. The spindle 8 is located frontward from the stator 26. The spindle 8 is at least partially located frontward from the rotor 27. The spindle 8 is at least partially located in front of the reducer 7. The spindle 8 is rotated by the rotor 27. The spindle 8 rotates with a rotational force from the rotor 27 transmitted by the reducer 7.

The spindle 8 includes a flange 8A and a spindle shaft 8B. The spindle shaft 8B protrudes frontward from the flange 8A. The planetary gears 42 are rotatably supported by the flange 8A with the pin 42P. The rotation axis of the spindle 8 aligns with the rotation axis AX of the motor 6. The spindle 8 rotates about the rotation axis AX.

The spindle 8 is rotatably supported by a spindle bearing 44. The spindle bearing 44 is held by the bearing box 24. The spindle 8 includes a ring portion 8C. The ring portion 8C protrudes rearward from the rear of the flange 8A. The spindle bearing 44 is located inward from the ring portion 8C. The spindle bearing 44 in the present embodiment includes an outer ring connected to the ring portion 8C. The spindle bearing 44 includes an inner ring supported by the bearing box 24.

The striker 9 is driven by the motor 6. A rotational force from the motor 6 is transmitted to the striker 9 through the reducer 7 and the spindle 8. The striker 9 strikes the anvil 10 in the rotation direction in response to a rotational force of the spindle 8 rotated by the motor 6. The striker 9 includes a hammer 47, balls 48, and a coil spring 49. The striker 9 including the hammer 47 is accommodated in the hammer case 4.

The hammer 47 is located frontward from the reducer 7. The hammer 47 is accommodated in the rear cylinder 4A. The hammer 47 surrounds the spindle shaft 8B. The hammer 47 is held by the spindle shaft 8B. The balls 48 are between the spindle shaft 8B and the hammer 47. The coil spring 49 is supported by the flange 8A and the hammer 47.

The hammer 47 is rotated by the motor 6. A rotational force from the motor 6 is transmitted to the hammer 47 through the reducer 7 and the spindle 8. The hammer 47 is rotatable together with the spindle 8 in response to a rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The balls 48 are formed from a metal such as steel. The balls 48 are between the spindle shaft 8B and the hammer 47. The spindle 8 has spindle grooves 8D. The spindle grooves 8D receive at least parts of the balls 48. The spindle grooves 8D are on the outer circumferential surface of the spindle shaft 8B. The hammer 47 has hammer grooves 47A. The hammer grooves 47A receive at least parts of the balls 48. The hammer grooves 47A are on the inner surface of the hammer 47. The balls 48 are between the spindle grooves 8D and the hammer grooves 47A. The balls 48 roll along the spindle grooves 8D and the hammer grooves 47A. The hammer 47 is movable together with the balls 48. The spindle 8 and the hammer 47 are movable relative to each other in the axial direction and in the rotation direction within a movable range defined by the spindle grooves 8D and the hammer grooves 47A.

The coil spring 49 generates an elastic force for moving the hammer 47 forward. The coil spring 49 is between the flange 8A and the hammer 47. An annular recess 47C is located on the rear surface of the hammer 47. The recess 47C is recessed frontward from the rear surface of the hammer 47. A washer 45 is received in the recess 47C. The rear end of the coil spring 49 is supported by the flange 8A. The front end of the coil spring 49 is received in the recess 47C and supported by the washer 45.

The anvil 10 is an output unit in the impact tool 1 and is operable with a rotational force from the motor 6. The anvil 10 rotates with the rotational force from the motor 6. The anvil 10 is located frontward from the motor 6. The anvil 10 is at least partially located frontward from the hammer 47. The anvil 10 has a tool hole 10A to receive a tip tool 90. The tip tool 90 is, for example, a screwdriver bit. The anvil 10 has the tool hole 10A in its front end. The tip tool 90 is attached to the anvil 10. The anvil 10 has a recess 10B on its rear end. The spindle shaft 8B includes a protrusion on its front end. The recess 10B on the rear end of the anvil 10 receives the protrusion on the front end of the spindle shaft 8B.

The anvil 10 includes a rod-like anvil shaft 10C and anvil projections 10D. The tool hole 10A is located in the front end of the anvil shaft 10C. The tip tool 90 is attached to the anvil shaft 10C. The anvil projections 10D are located on the rear end of the anvil 10. The anvil projections 10D protrude radially outward from the rear end of the anvil shaft 10C.

The anvil 10 is rotatably supported by anvil bearings 46. The rotation axis of the anvil 10, the rotation axis of the hammer 47, and the rotation axis of the spindle 8 align with the rotation axis AX of the motor 6. The anvil 10 rotates about the rotation axis AX. The anvil bearings 46 are located inward from the front cylinder 4B. The anvil bearings 46 are held by the front cylinder 4B in the hammer case 4. The anvil bearings 46 support the anvil shaft 10C. In the present embodiment, two anvil bearings 46 are arranged in the front-rear direction.

The hammer 47 includes hammer projections 47B protruding frontward. The hammer projections 47B can come in contact with the anvil projections 10D. When the motor 6 operates with the hammer projections 47B and the anvil projections 10D in contact with each other, the anvil 10 rotates together with the hammer 47 and the spindle 8.

The anvil 10 is struck by the hammer 47 in the rotation direction. When, for example, the anvil 10 receives a higher load in a screwing operation, the anvil 10 cannot rotate with power generated by the motor 6 alone. This stops the rotation of the anvil 10 and the hammer 47. The spindle 8 and the hammer 47 are movable relative to each other in the axial direction and in the circumferential direction with the balls 48 in between. When the hammer 47 stops rotating, the spindle 8 continues to rotate with the power generated by the motor 6. When the hammer 47 stops rotating and the spindle 8 rotates, the balls 48 move backward as being guided along the spindle grooves 8D and the hammer grooves 47A. The hammer 47 receives a force from the balls 48 to move backward with the balls 48. In other words, the hammer 47 moves backward when the anvil 10 stops rotating and the spindle 8 rotates. Thus, the hammer projections 47B and the anvil projections 10D come out of contact with each other.

The coil spring 49 generates an elastic force for moving the hammer 47 forward. The hammer 47 that has moved backward then moves forward under the elastic force from the coil spring 49. When moving forward, the hammer 47 receives a force in the rotation direction from the balls 48. In other words, the hammer 47 moves forward while rotating. The hammer projections 47B then come in contact with the anvil projections 10D while rotating. Thus, the anvil projections 10D are struck by the hammer projections 47B in the rotation direction. The anvil 10 receives power from the motor 6 and an inertial force from the hammer 47. The anvil thus rotates about the rotation axis AX at high torque.

The tool holder 11 surrounds a front portion of the anvil 10. The tool holder 11 holds the tip tool 90 received in the tool hole 10A.

The fan 12 rotates with a rotational force from the motor 6. The fan 12 is located rearward from the stator 26 in the motor 6. The fan 12 generates an airflow for cooling the motor 6. The fan 12 is fastened to at least a part of the rotor 27. The fan 12 is fastened to the rear portion of the rotor shaft 33 with a bush 12A. The fan 12 is between the rotor bearing 39 and the stator 26. The fan 12 rotates as the rotor 27 rotates. As the rotor shaft 33 rotates, the fan 12 rotates together with the rotor shaft 33. Thus, air outside the housing 2 flows into the internal space of the housing 2 through the inlets 19 to cool the motor 6. As the fan 12 rotates, the air passing through the internal space of the housing 2 flows out of the housing 2 through the outlets 20.

The battery mount 13 is located in a lower portion of the battery holder 23. A battery pack 25 is attached to the battery mount 13 in a detachable manner. The battery pack serves as a power supply for the impact tool 1. The battery pack 25 includes a secondary battery. The battery pack 25 in the present embodiment includes a rechargeable lithium-ion battery. The battery pack 25 is attached to the battery mount 13 to power the impact tool 1. The motor 6 and the light unit 18 are each driven by power supplied from the battery pack 25.

The trigger lever 14 is located on the grip 22. The trigger lever 14 is operable by the operator to activate the motor 6. The trigger lever 14 is operable to switch the motor 6 between the driving state and the stopped state.

The forward-reverse switch lever 15 is located above the grip 22. The forward-reverse switch lever 15 is operable by the operator. The forward-reverse switch lever is operable to switch the rotation direction of the motor 6 between forward and reverse. This operation switches the rotation direction of the spindle 8.

The hand mode switch button 16 is located above the trigger lever 14. The hand mode switch button 16 is operable by the operator. A circuit board 16A and a switch 16B are located behind the hand mode switch button 16. The switch 16B is mounted on the front surface of the circuit board 16A. The hand mode switch button 16 is located in front of the switch 16B. When the hand mode switch button 16 is pushed backward, the switch 16B is activated to cause the circuit board 16A to output an operation signal. The operation signal output from the circuit board 16A is transmitted to a controller (not shown). The controller changes the control mode of the motor 6 in response to the operation signal output from the circuit board 16A.

Light Unit

Figure 5:
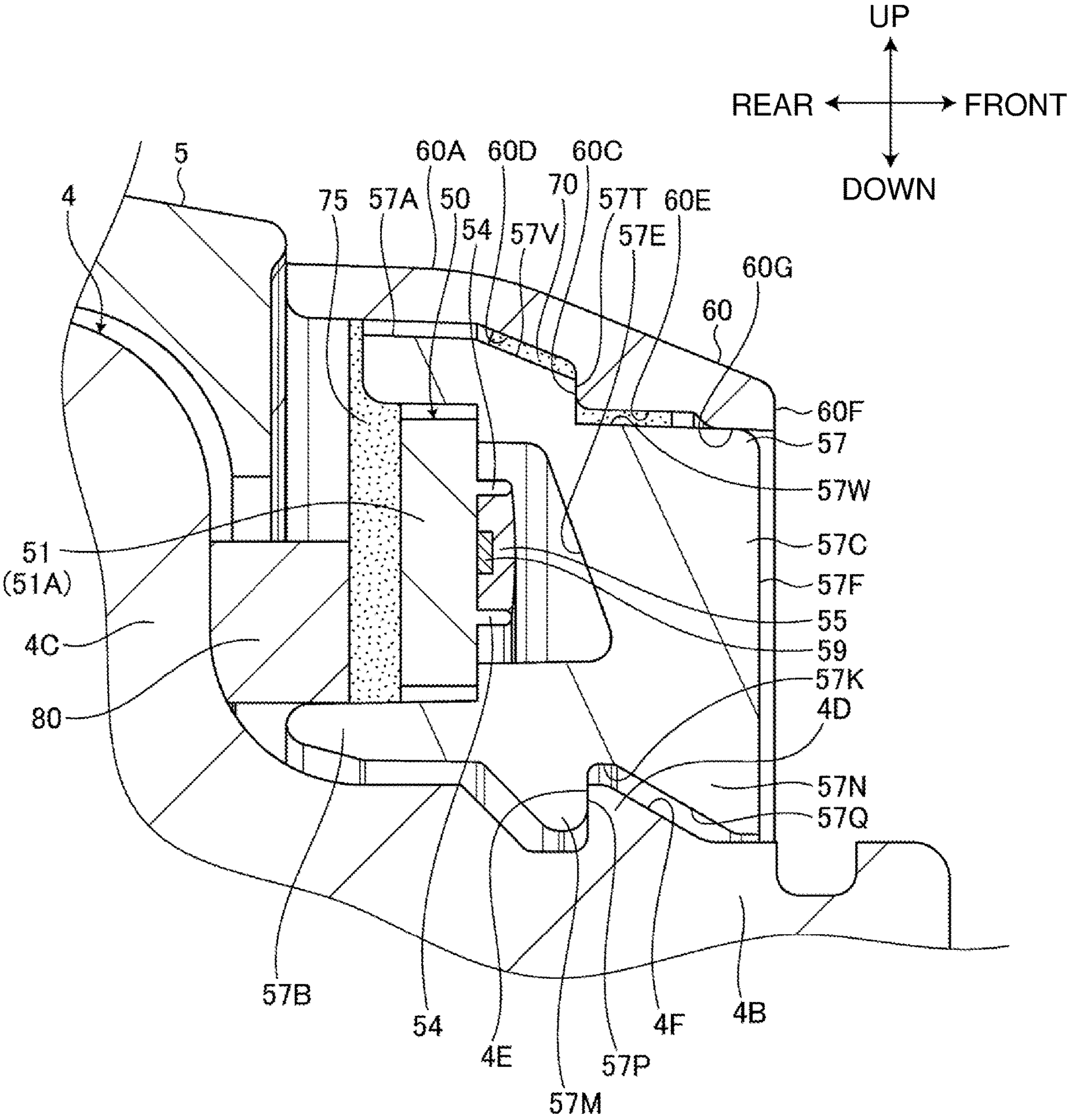
FIG. 5 is a partial sectional view of a light unit in the embodiment.
Figure 6:
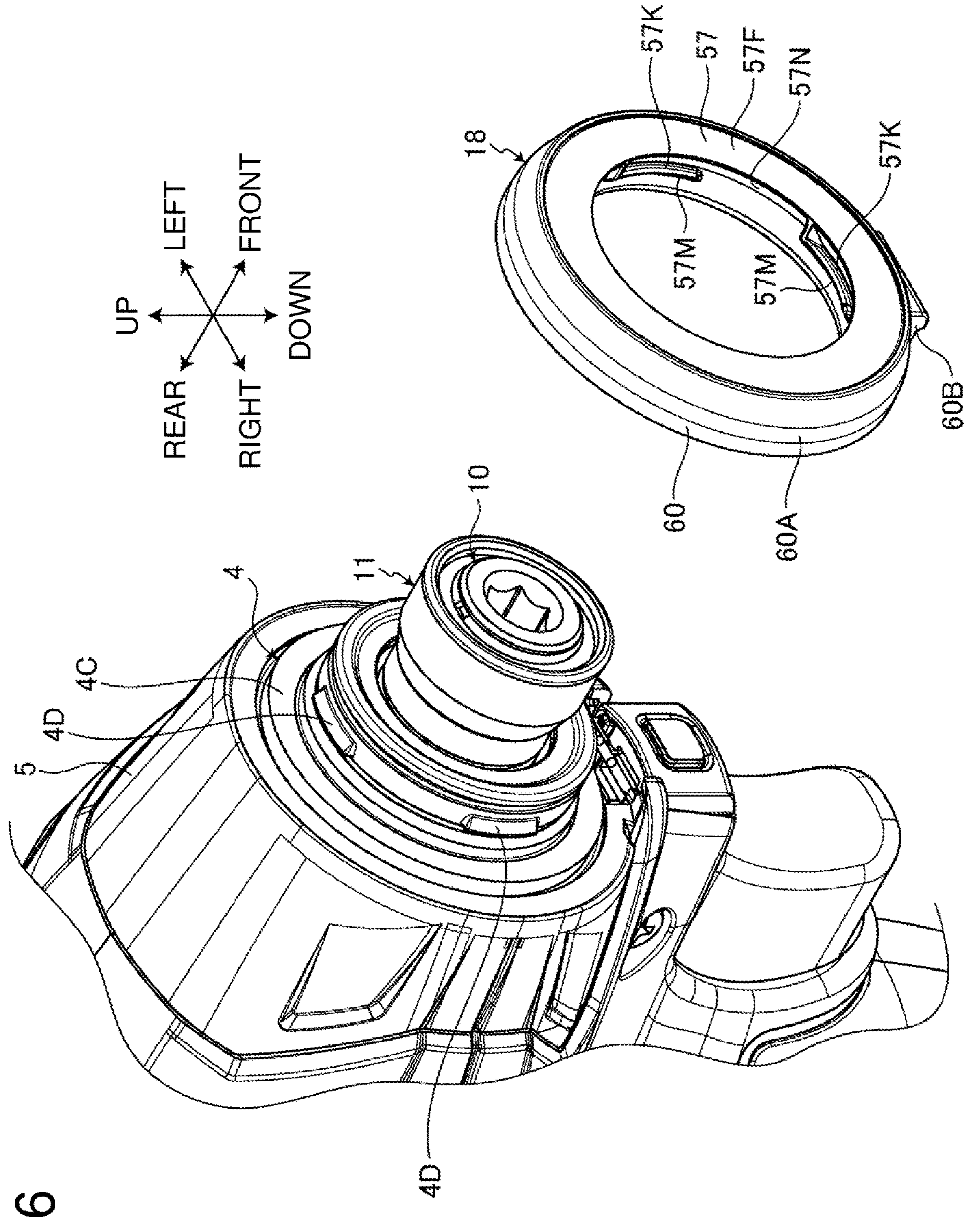
FIG. 6 is an exploded perspective view of the upper portion of the electric work machine according to the embodiment as viewed from the front.
Figure 7:
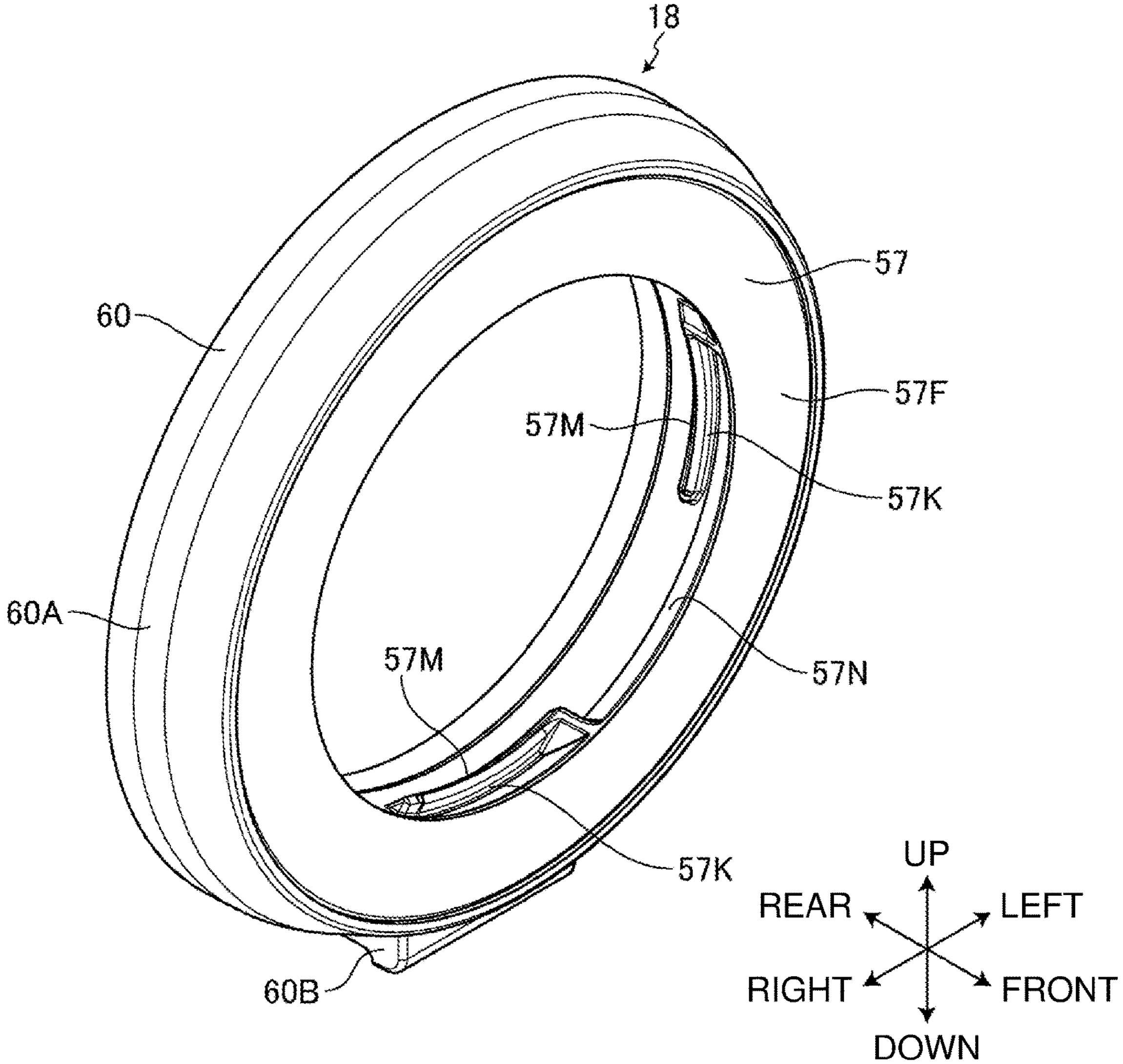
FIG. 7 is a perspective view of the light unit in the embodiment as viewed from the front.
Figure 8:
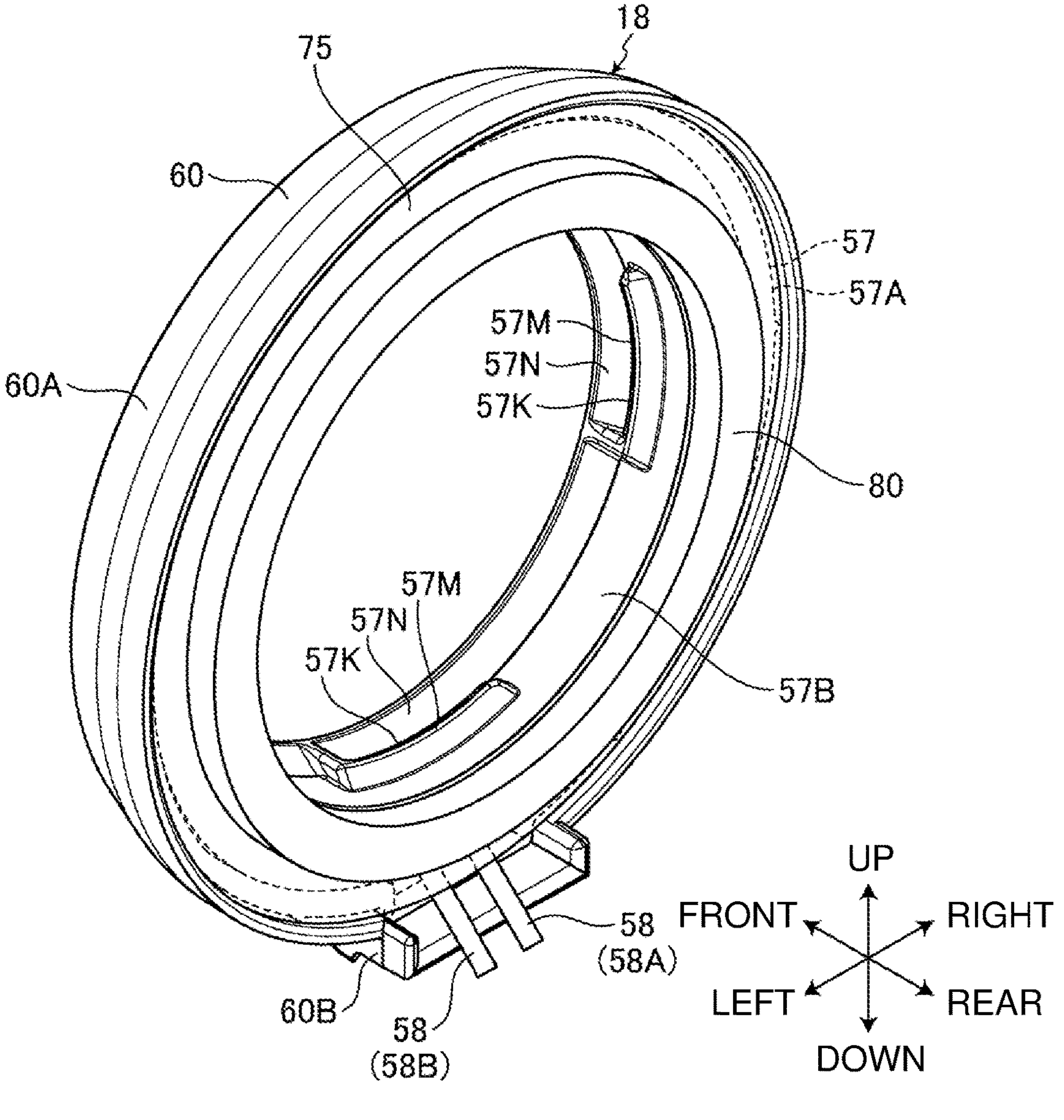
FIG. 8 is a perspective view of the light unit in the embodiment as viewed from the rear.
Figure 9:
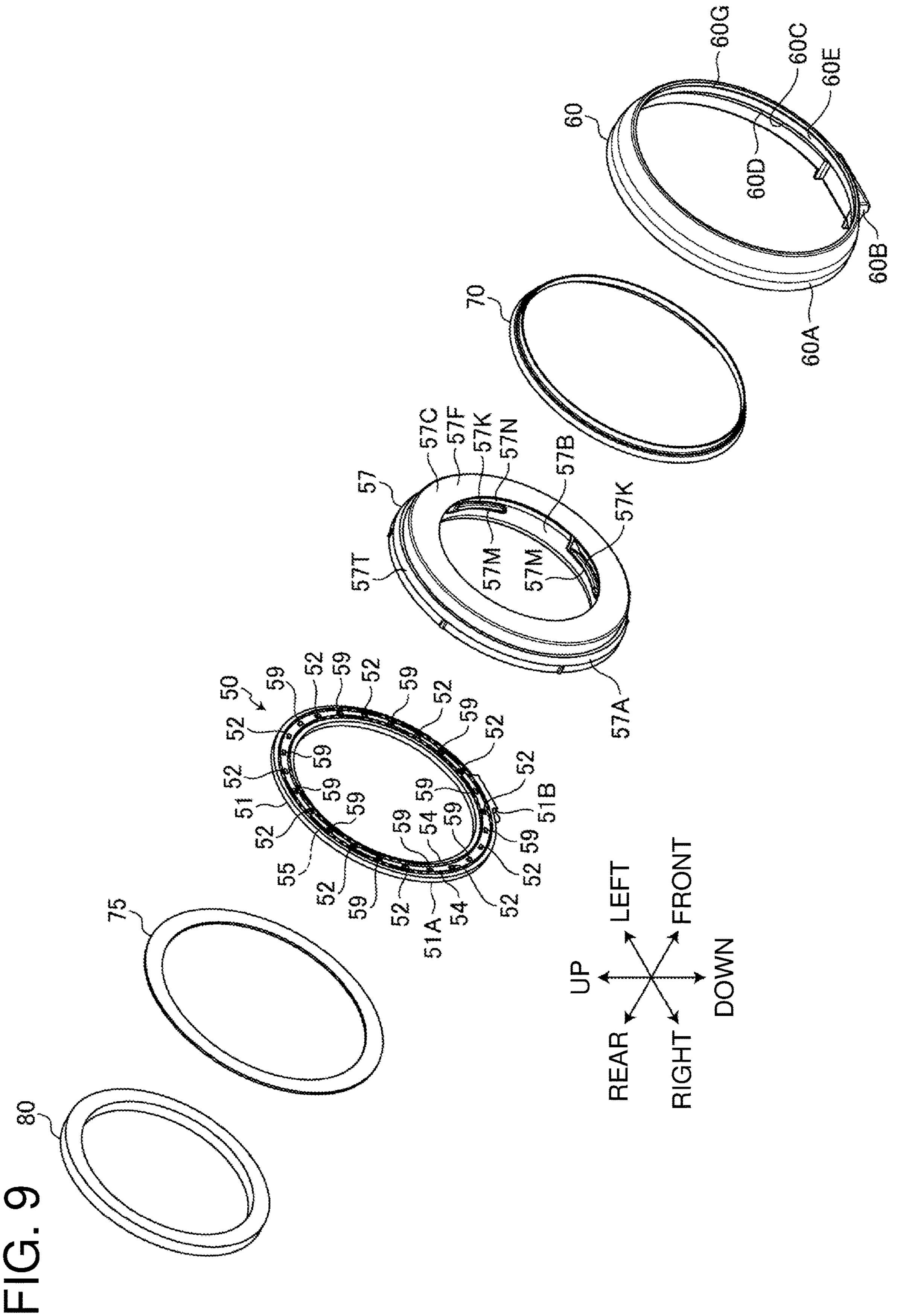
FIG. 9 is an exploded perspective view of the light unit in the embodiment as viewed from the front.
Figure 10:
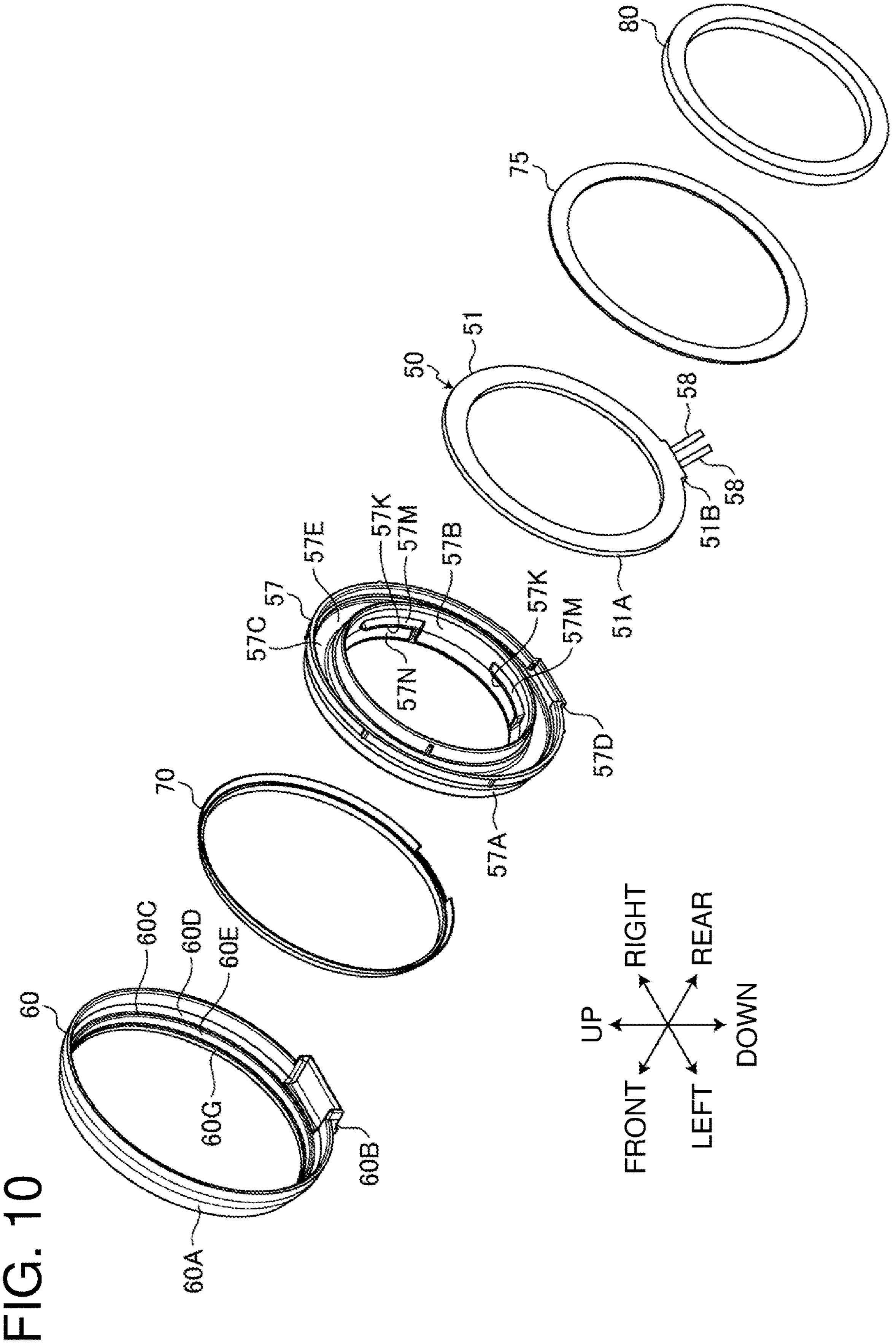
FIG. 10 is an exploded perspective view of the light unit in the embodiment as viewed from the rear.

FIG. 5 is a partial sectional view of the light unit 18 in the present embodiment. FIG. 6 is an exploded perspective view of the upper portion of the impact tool 1 as viewed from the front. FIG. 7 is a perspective view of the light unit 18 as viewed from the front. FIG. 8 is a perspective view of the light unit 18 as viewed from the rear. FIG. 9 is an exploded perspective view of the light unit 18 as viewed from the front. FIG. 10 is an exploded perspective view of the light unit 18 as viewed from the rear.

The light unit 18 emits illumination light. The light unit 18 illuminates the anvil 10 and an area around the anvil 10 with illumination light. The light unit 18 illuminates an area ahead of the anvil 10 with illumination light. The light unit 18 also illuminates the tip tool 90 attached to the anvil 10 and an area around the tip tool 90 with illumination light. The light unit 18 illuminates a workpiece to be processed with the impact tool 1 with illumination light.

The light unit 18 is located at the front of the hammer case 4. The light unit 18 surrounds the front cylinder 4B. The light unit 18 surrounds the anvil shaft 10C with the front cylinder 4B in between.

The light unit 18 includes a chip-on-board light emitting diode (COB LED) 50, an optical member 57, and a light shield 60.

The COB LED 50 includes a substrate 51, LED chips 52 being light emitters, banks 54, a phosphor 55, and resistors 59.

Figure 11:
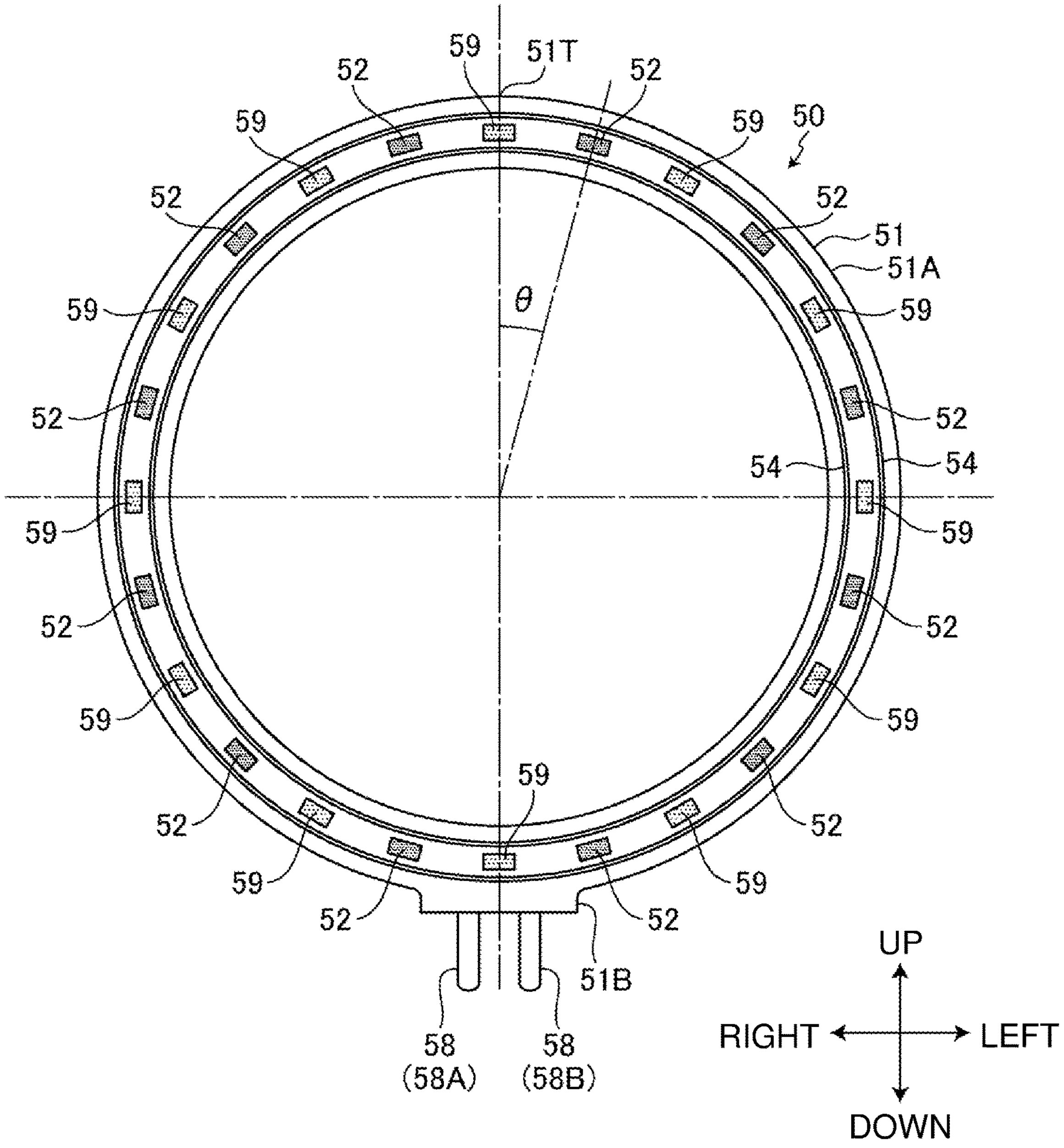
FIG. 11 is a front view of a COB LED in the embodiment.
Figure 12:
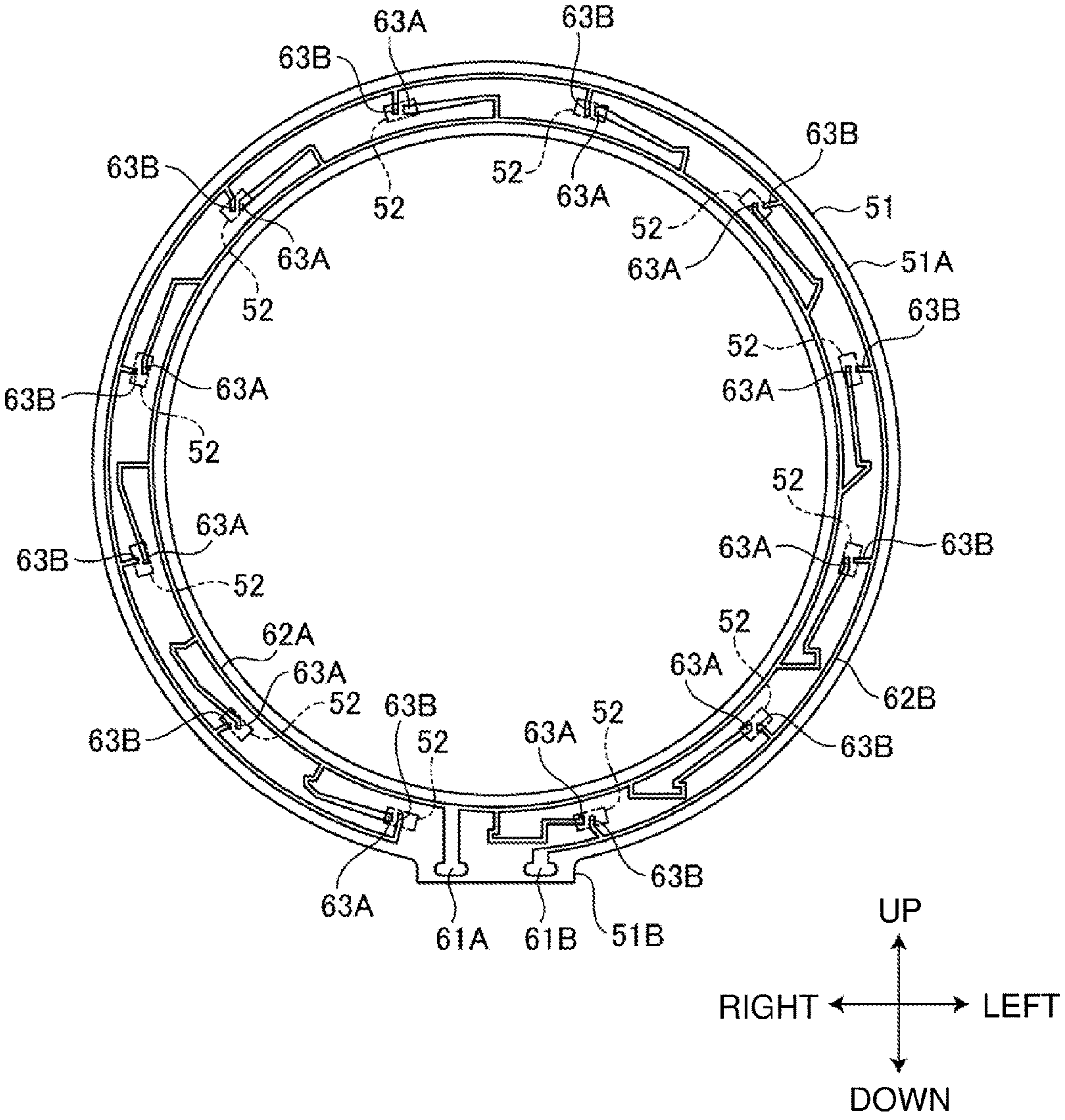
FIG. 12 is a front view of a substrate in the embodiment.

FIG. 11 is a front view of the COB LED 50 in the present embodiment. In FIG. 11, the phosphor 55 is not shown. FIG. 12 is a front view of the substrate 51.

The substrate 51 supports the LED chips 52 and the resistors 59. The substrate 51 is, for example, an aluminum substrate, a glass fabric base epoxy resin substrate (flame retardant 4 or FR-4 substrate), or a composite base epoxy resin substrate (composite epoxy material 3 or CEM-3 substrate). The substrate 51 extends at least above, on the left, and on the right of the anvil 10 (anvil shaft 10C). The substrate 51 in the present embodiment is annular and surrounds the anvil 10 (anvil shaft 10C). The substrate 51 may have a cutout in its lower portion.

The LED chips 52 are mounted on the front surface of the substrate 51. The multiple LED chips 52 are mounted on the front surface of the substrate 51 at intervals in the circumferential direction of the anvil 10 (anvil shaft 10C). The LED chips 52 are connected to wiring on the substrate 51 with gold wires.

The banks 54 are located on the front surface of the substrate 51. The banks 54 protrude frontward from the front surface of the substrate 51. The banks 54 surround the LED chips 52. One bank 54 is located radially inward from the LED chips 52, and the other bank 54 is located radially outward from the LED chips 52. The banks 54 define a space for the phosphor 55.

The phosphor 55 covers the LED chips 52 between the banks 54. As shown in FIG. 12, the substrate 51 receives a positive electrode 61A and a negative electrode 61B outside the banks 54 on the front surface. The positive electrode 61A and the negative electrode 61B may be located on the rear surface of the substrate 51. Power output from the battery pack 25 is supplied to the electrodes (the positive electrode 61A and the negative electrode 61B). The power supplied to the electrodes is supplied to the LED chips 52 through the substrate 51 and the gold wires. The LED chips 52 emit light with power supplied from the battery pack 25. The voltage of the battery pack 25 is decreased to 5 V by the controller (not shown) and applied to the LED chips 52.

The substrate 51 is annular. The substrate 51 surrounds the anvil shaft 10C with the front cylinder 4B in between. The substrate 51 includes a ring portion 51A and a support 51B. The ring portion 51A surrounds the anvil 10 (anvil shaft 10C). The support 51B protrudes downward from a lower portion of the ring portion 51A.

The multiple LED chips 52 are mounted on the front surface of the ring portion 51A of the substrate 51. The LED chips 52 at least partially surround the anvil shaft 10C with the front cylinder 4B in between. The LED chips 52 are multiple (12 in the present embodiment) LED chips 52 arranged on the front surface of the ring portion 51A at intervals in the circumferential direction of the ring portion 51A.

The resistors 59 are mounted on the front surface of the ring portion 51A. Each resistor 59 is between a pair of LED chips 52 adjacent to each other on the front surface of the ring portion 51A. The resistors 59 are multiple (12 in the present embodiment) resistors 59 arranged at intervals in the circumferential direction of the ring portion 51A on the front surface of the ring portion 51A.

The banks 54 are located on the front surface of the ring portion 51A of the substrate 51. The banks 54 protrude frontward from the front surface of the ring portion 51A. One bank 54 is located on the front surface of the ring portion 51A and radially inward from the LED chips 52, and the other bank 54 is located on the front surface of the ring portion 51A and radially outward from the LED chips 52. The banks 54 define the space for the phosphor 55.

The banks 54 are annular. The banks 54 in the present embodiment have a double annular structure. More specifically, the banks 54 in the present embodiment include a first bank 54 and a second bank 54. The first bank 54 is annular and located on the front surface of the ring portion 51A. The second bank 54 is annular and located radially outward from the first bank 54 on the front surface of the ring portion 51A. The first bank 54 is located radially inward from the LED chips 52. The second bank 54 is located radially outward from the LED chips 52. The LED chips 52 are between the first bank 54 and the second bank 54.

The phosphor 55 is located on the front surface of the ring portion 51A of the substrate 51. The phosphor 55 is annular. The phosphor 55 covers the LED chips 52 between the banks 54. More specifically, the phosphor 55 covers the LED chips 52 between the first bank 54 and the second bank 54.

A pair of lead wires 58 are connected to the substrate 51. One lead wire 58 is a positive lead wire 58A to receive a positive voltage. The other lead wire 58 is a negative lead wire 58B to receive a negative voltage. The voltage of the battery pack 25 is applied to the lead wires 58 through the controller (not shown). The positive electrode 61A shown in FIG. 12 is connected to the positive lead wire 58A. The negative electrode 61B is connected to the negative lead wire 58B. The pair of lead wires 58 are supported on the rear surface of the support 51B. The lead wires 58 may be supported on the front surface of the support 51B.

A current output from the battery pack 25 is supplied to the electrodes (the positive electrode 61A and the negative electrode 61B) through the controller (not shown) and the lead wires 58. The voltage of the battery pack 25 is decreased by the controller (not shown) and applied to the electrodes (the positive electrode 61A and the negative electrode 61B). The current supplied to the electrodes (the positive electrode 61A and the negative electrode 61B) is supplied to the LED chips 52 through the wiring on the substrate 51 and the gold wires. The LED chips 52 are turned on with the current supplied from the battery pack 25.

The optical member 57 is connected to the COB LED 50. The optical member 57 is fixed to the substrate 51. The optical member 57 is formed from a polycarbonate resin. The optical member 57 in the present embodiment is formed from a polycarbonate resin containing a white diffusion material. The optical member 57 is at least partially located frontward from the COB LED 50. The optical member 57 includes an outer cylinder 57A, an inner cylinder 57B, a light transmitter 57C, and a protrusion 57D.

The outer cylinder 57A is located radially outward from the inner cylinder 57B. The outer cylinder 57A is located radially outward from the LED chips 52. The COB LED 50 is at least partially located between the outer cylinder 57A and the inner cylinder 57B in the radial direction. The outer cylinder 57A is located radially outward from the ring portion 51A of the substrate 51. The inner cylinder 57B is located radially inward from the ring portion 51A of the substrate 51. The inner cylinder 57B is located radially inward from the LED chips 52.

The light transmitter 57C is annular. The light transmitter 57C is located frontward from the LED chips 52. The light transmitter 57C connects the front end of the outer cylinder 57A and the front end of the inner cylinder 57B. The light transmitter 57C faces the front surface of the ring portion 51A. The light transmitter 57C faces the LED chips 52. Light emitted from the LED chips 52 passes through the light transmitter 57C and illuminates an area ahead of the light unit 18.

The light transmitter 57C has an incident surface 57E and an emission surface 57F. Light from the LED chips 52 enters the incident surface 57E. The light passing through the light transmitter 57C is emitted through the emission surface 57F. The front surface of the ring portion 51A faces the incident surface 57E of the light transmitter 57C. The incident surface 57E faces the LED chips 52. The incident surface 57E faces substantially rearward. The emission surface 57F faces substantially frontward.

The protrusion 57D protrudes downward from a lower portion of the outer cylinder 57A. The protrusion 57D defines an accommodation space inside. The support 51B in the substrate 51 is received in the accommodation space inside the protrusion 57D.

The light shield 60 is located radially outward from the outer cylinder 57A in the optical member 57. The light shield 60 has a lower light transmittance than the optical member 57. Light emitted from the LED chips 52 may at least partially pass through the outer cylinder 57A. The light shield 60 blocks light from the LED chips 52 emitted through the outer circumferential surface of the outer cylinder 57A. The light shield 60 reduces the likelihood that light from the LED chips 52 emitted through the outer circumferential surface of the outer cylinder 57A illuminates an area around the optical member 57.

The light shield 60 is formed from a synthetic resin. The light shield 60 in the present embodiment is formed from a polycarbonate resin. The light shield 60 is formed from a polycarbonate resin containing a colored pigment. The colored pigment is, for example, a black pigment or a gray pigment. The light shield 60 in the present embodiment is formed from a polycarbonate resin containing a black pigment. The light shield 60 is black. The light shield 60 may be formed from a polycarbonate resin containing a gray pigment. The light shield 60 may be gray.

The light shield 60 includes a cylinder 60A and a protrusion 60B. The cylinder 60A surrounds the outer cylinder 57A. The cylinder 60A covers the outer circumferential surface of the outer cylinder 57A. The protrusion 60B protrudes downward from a lower portion of the cylinder 60A. The protrusion 60B covers the outer surface of the protrusion 57D. The protrusion 60B covers the protrusion 57D from below.

The light shield 60 is fixed to the optical member 57. In the present embodiment, the optical member 57 and the light shield 60 are fixed together with a first adhesive 70. The first adhesive 70 is between the outer circumferential surface of the outer cylinder 57A and the inner circumferential surface of the cylinder 60A.

The light shield 60 in the present embodiment has grooves 60D and 60E. The grooves 60D and 60E are recessed radially outward from the inner circumferential surface of the cylinder 60A. The groove 60D is located rearward from the groove 60E. An abutment surface 60C is located at the boundary between the grooves 60D and 60E in the front-rear direction. The abutment surface 60C faces rearward. The abutment surface 60C is annular.

The optical member 57 has a facing surface 57T facing the abutment surface 60C. The optical member 57 has grooves 57V and 57W. The grooves 57V and 57W are recessed radially inward from the outer circumferential surface of the optical member 57. The groove 57V is located rearward from the groove 57W. The facing surface 57T is located at the boundary between the grooves 57V and 57W. The facing surface 57T faces frontward. The abutment surface 60C and the facing surface 57T are in contact with each other.

The first adhesive 70 fills the grooves 60D and 60E. The first adhesive 70 fills the grooves 57V and 57W. The first adhesive 70 is retained in a space between the groove 60D and the groove 57V and a space between the groove 60E and the groove 57W. The optical member 57 and the light shield 60 are fixed together with the first adhesive 70 filling the grooves 57V and 57W.

The light shield 60 includes a protrusion 60G. The protrusion 60G is located frontward from the grooves 60D, 60E, 57V, and 57 W and protrudes radially inward from the inner circumferential surface of the cylinder 60A. The protrusion 60G has an inner end in the radial direction in contact with the outer circumferential surface of the optical member 57. The protrusion 60G surrounds the optical member 57. The optical member 57 is fitted to the inner circumference of the protrusion 60G.

The light shield 60 has a front end 60F surrounding the emission surface 57F of the light transmitter 57C. The front end 60F of the light shield 60 is located frontward from the front end of the light transmitter 57C. The front end 60F of the light shield 60 may be aligned with the front end of the light transmitter 57C in the front-rear direction. In this structure, light is less likely to leak radially outward from the optical member 57.

The light unit 18 including the COB LED 50 and the light shield 60 surrounds the anvil shaft 10C in the anvil 10. The light unit 18 surrounds the front cylinder 4B in the hammer case 4. The inner cylinder 57B in the optical member 57 surrounds the front cylinder 4B in the hammer case 4. The inner cylinder 57B in the optical member 57 is supported on the front cylinder 4B in the hammer case 4. The inner cylinder 57B in the optical member 57 is fixed to the front cylinder 4B in the hammer case 4 in a manner immovable in the axial direction.

The substrate 51 is between the outer cylinder 57A and the inner cylinder 57B in the radial direction. The substrate 51 is fixed to the optical member 57. As shown in FIG. 5, the substrate 51 and the optical member 57 are fixed together with a second adhesive 75. The second adhesive 75 fixes the rear surface of the substrate 51 and the inner circumferential surface of the outer cylinder 57A together. The second adhesive 75 may fix the rear surface of the substrate 51 and the outer circumferential surface of the inner cylinder 57B together. The second adhesive 75 is light-shielding. The second adhesive 75 in the present embodiment is a black adhesive.

As shown in FIGS. 5 and 6, the front cylinder 4B includes protrusions 4D on its outer circumferential surface. The protrusions 4D protrude radially outward from the outer circumferential surface of the front cylinder 4B. The protrusions 4D are multiple (four in the present embodiment) protrusions 4D arranged circumferentially at intervals. Each protrusion 4D has a surface including a rear surface 4E facing rearward and a slope 4F sloping radially inward toward the front.

The light unit 18 is supported on the front cylinder 4B in the hammer case 4. The optical member 57 includes, on the inner circumference surface of the inner cylinder 57B, rear slides 57M and front slides 57N. The rear slides 57M and the front slides 57N protrude radially inward from the inner circumferential surface of the inner cylinder 57B. The front slides 57N are located frontward from the rear slides 57M. The rear slides 57M are four rear slides 57M arranged circumferentially at intervals. The front slides 57N are located in front of the four rear slides 57M. A recess 57K is between each rear slide 57M and the corresponding front slide 57N. The protrusions 4D are received in the recesses 57K. Each rear slide 57M has a front surface 57P in contact with the rear surface 4E of the corresponding protrusion 4D. Each front slide 57N has a slope 57Q facing the slope 4F of the corresponding protrusion 4D.

An insertion opening is between an end of each rear slide 57M in a first circumferential direction and the corresponding front slide 57N. The protrusions 4D are received in the recesses 57K through the insertion openings. The protrusions 4D are placed through the insertion openings, and then the light unit 18 is rotated. This causes the protrusions 4D to be received in the recesses 57K. The optical member 57 and the front cylinder 4B in the hammer case 4 are thus fixed together. This fixes the light unit 18 and the hammer case 4 together.

Light emitted from the LED chips 52 enters the incident surface 57E through the phosphor 55. As shown in, for example, FIG. 5, the incident surface 57E slopes radially inward toward the front. Light incident on the incident surface 57E passes through the light transmitter 57C and is emitted through the emission surface 57F.

Light incident on the incident surface 57E at least partially reaches the slopes 57Q. The slopes 57Q slope radially inward toward the front. Light reaching the slopes 57Q is fully reflected from the slopes 57Q, travels forward, and is emitted through the emission surface 57F.

In the present embodiment, a sponge ring 80 is located behind the COB LED 50. The sponge ring 80 has a rear surface supported on the annular portion 4C of the hammer case 4. The sponge ring 80 is at least partially compressed and in contact with the light unit 18. In the example shown in FIG. 5, the sponge ring 80 is in contact with the inner cylinder 57B in the optical member 57 and the second adhesive 75. The light unit 18 is supported on the compressed sponge ring 80 and is thus less likely to rattle relative to the hammer case 4. The sponge ring 80 may support the inner cylinder 57B.

As shown in FIG. 11, the multiple LED chips 52 are mounted on the front surface of the ring portion 51A of the substrate 51. The LED chips 52 at least partially surround the anvil shaft 10C with the front cylinder 4B in between. The LED chips 52 are multiple (12 in the present embodiment) LED chips 52 arranged on the front surface of the ring portion 51A at intervals in the circumferential direction of the ring portion 51A.

Each resistor 59 is between a pair of LED chips 52 adjacent to each other on the front surface of the ring portion 51A. The resistors 59 are multiple (12 in the present embodiment) resistors 59 arranged on the front surface of the ring portion 51A at intervals in the circumferential direction of the ring portion 51A.

The LED chips 52 and the resistors 59 alternate circumferentially on the front surface of the ring portion 51A.

The banks 54 include the first bank 54 and the second bank 54. The first bank 54 is annular and located on the front surface of the ring portion 51A. The second bank 54 is annular and located radially outward from the first bank 54 on the front surface of the ring portion 51A. The LED chips 52 and the resistors 59 are between the first bank 54 and the second bank 54.

An apex 51T is defined in a part of the ring portion 51A immediately above the anvil shaft 10C. The apex 51T is at an angular position of 0° in the circumferential direction. The angular position of 0° is immediately above the rotation axis AX (anvil shaft 10C). The angular position of 180° is immediately below the rotation axis AX (anvil shaft 10C).

The LED chip 52 nearest the apex 51T immediately above the anvil shaft 10C is at a position shifted circumferentially by a predetermined angle θ from the apex 51T. The predetermined angle θ is 15° in the present embodiment. The LED chips 52 are at angular positions of 15, 45, 75, 105, 135, 165, 195, 225, 255, 285, 315, and 345° about the rotation axis AX.

One resistor 59 is located at the apex 51T. The resistors 59 are at angular positions of 0, 30, 60, 90, 120, 150, 180, 210, 240, 270, 300, and 330° about the rotation axis AX.

The multiple LED chips 52 are line symmetric to one another with respect to a straight line extending vertically and including the central axis (rotation axis AX) of the anvil shaft 10C and the apex 51T. The multiple resistors 59 are line symmetric to one another with respect to the straight line extending vertically and including the central axis (rotation axis AX) of the anvil shaft 10C and the apex 51T.

As shown in FIG. 12, the support 51B includes the positive electrode 61A and the negative electrode 61B on the front surface. The positive electrode 61A and the negative electrode 61B are located outside the banks 54. The positive electrode 61A is connected to the positive lead wire 58A. The negative electrode 61B is connected to the negative lead wire 58B. The positive electrode 61A receives a positive voltage from the battery pack 25 through the positive lead wire 58A. The negative electrode 61B receives a negative voltage from the battery pack 25 through the negative lead wire 58B. Each LED chip 52 is connected in parallel to the positive electrode 61A and the negative electrode 61B.

In the present embodiment, the ring portion 51A includes a positive relay line 62A and a negative relay line 62B on its front surface. The positive relay line 62A and the negative relay line 62B are substantially annular. The positive relay line 62A is located radially inward from the LED chips 52. The negative relay line 62B is located radially outward from the LED chips 52. Multiple (12 in the present embodiment) positive power lines 63A branch from the positive relay line 62A. Multiple (12 in the present embodiment) negative power lines 63B branch from the negative relay line 62B. The positive power lines 63A and the negative power lines 63B are located on the front surface of the ring portion 51A. The positive power lines 63A and the negative power lines 63B are connected to the respective LED chips 52. The single positive power line 63A and the single negative power line 63B are connected to the single LED chip 52. The resistors 59 (not shown in FIG. 12) are located on the respective positive power lines 63A. Each resistor 59 is located on the corresponding positive power line 63A.

A current output from the battery pack 25 is supplied to the positive electrode 61A through the controller (not shown) and the positive lead wire 58A. The current supplied to the positive electrode 61A is supplied to the twelve LED chips 52 through the positive relay line 62A and the positive power lines 63A. The LED chips 52 are turned on with power supplied from the battery pack 25.

Assembly Method

To assemble the light unit 18, the light shield 60 is first attached to the optical member 57. The optical member 57 is placed on a predetermined support surface with the emission surface 57F facing upward. The first adhesive 70 is then applied to the outer circumferential surface of the optical member 57 including the facing surface 57T. In the present embodiment, the first adhesive 70 is applied to the grooves 57V and 57W. The light shield 60 is then placed onto the optical member 57 from above the optical member 57. The first adhesive 70 may be applied to the grooves 60D and 60E on the light shield 60, and then the light shield 60 may be placed onto the optical member 57. When the light shield 60 is placed onto the optical member 57, the abutment surface 60C and the facing surface 57T come in contact with each other. A front portion of the optical member 57 is fitted to the protrusion 60G. The optical member 57 is lightly press-fitted to the inner circumference of the protrusion 60G. The light shield 60 is lightly press-fitted to the optical member 57 to cause the first adhesive 70 to wet and spread in the grooves 57V and 57W. The first adhesive 70 applied to the grooves 57V and 57W is less likely to move upward, and thus does not reach the emission surface 57F when the light shield 60 is placed onto the optical member 57. The inner end of the protrusion 60G in the radial direction coming in contact with the outer circumferential surface of the optical member 57 also prevents the first adhesive 70 applied to the grooves 57V and 57W from reaching the emission surface 57F. The first adhesive 70 may at least partially flow between a rear end portion (lower end portion) of the outer cylinder 57A in the optical member 57 and a rear end portion of the inner circumferential surface of the light shield 60, but does not flow to the emission surface 57F. The first adhesive 70 is thus less likely to stain the emission surface 57F. The first adhesive 70 does not adhere to the emission surface 57F and is thus less likely to block light to be emitted through the emission surface 57F. The substrate 51 and the optical member 57 are fixed together with the second adhesive 75.

Once the optical member 57, the light shield 60, and the COB LED 50 are fixed together with the first adhesive 70 and the second adhesive 75, the light unit 18 and the hammer case 4 are fixed together. As described above, the protrusions 4D are placed through the insertion openings between the ends of the rear slides 57M in the first circumferential direction and the corresponding front slides 57N, and then the light unit 18 is rotated. This causes the protrusions 4D to be received in the recesses 57K. This fixes the light unit 18 and the hammer case 4 together. The light unit 18 is at least partially in contact with the sponge ring 80 supported on the annular portion 4C and is thus less likely to rattle relative to the hammer case 4. With the inner cylinder 57B in the optical member 57 fixed to the front cylinder 4B in the hammer case 4, the light unit 18 is fixed to the hammer case 4 in the axial direction alone. The hammer case 4 and the protrusion 60B on the light shield 60 are then held between the left housing 2L and the right housing 2R. This fixes the hammer case 4 and the light unit 18 to the housing 2 in the rotation direction. The left housing 2L and the right housing 2R are then fastened together with the screws 2S.

Method of Use

The operator operates the trigger lever 14 to activate the motor 6 and cause the LED chips 52 in the COB LED 50 to emit light. The COB LED 50 emits light with high luminance and thus can brightly illuminate a workpiece.

When light emitted from the LED chips 52 at least partially passes through the outer cylinder 57A, such light emitted through the outer circumferential surface of the outer cylinder 57A may reach the eyes of the operator and cause glare to the operator. This may lower the visibility of the workpiece by the operator. In the present embodiment, the light shield 60 reduces glare to the operator.

As described above, the impact tool 1 according to the present embodiment includes the motor 6, the housing 2 including the motor compartment 21 accommodating the motor 6 and the grip 22 protruding downward from the motor compartment 21, the anvil 10 as the output unit located frontward from the motor 6 and operable with a rotational force from the motor 6, the substrate 51 extending above, on the left, and on the right of the anvil 10, and the LED chips 52 being multiple light emitters mounted on the front surface of the substrate 51 at intervals in the circumferential direction of the anvil 10. The LED chip 52 nearest the apex 51T of the substrate 51 immediately above the anvil 10 is at the position shifted circumferentially by the predetermined angle θ from the apex 51T.

When the light unit 18 includes the substrate 51 and the LED chips 52 in the above structure, no LED chip 52 is located at the apex 51T. When, for example, the impact tool 1 falls and the apex 51T receives a shock, the LED chips 52 are less likely to break or separate from the substrate 51. The LED chips 52 are thus less likely to be unlighted. This reduces the likelihood of the light unit 18 having lower light emission performance.

Figure 13:
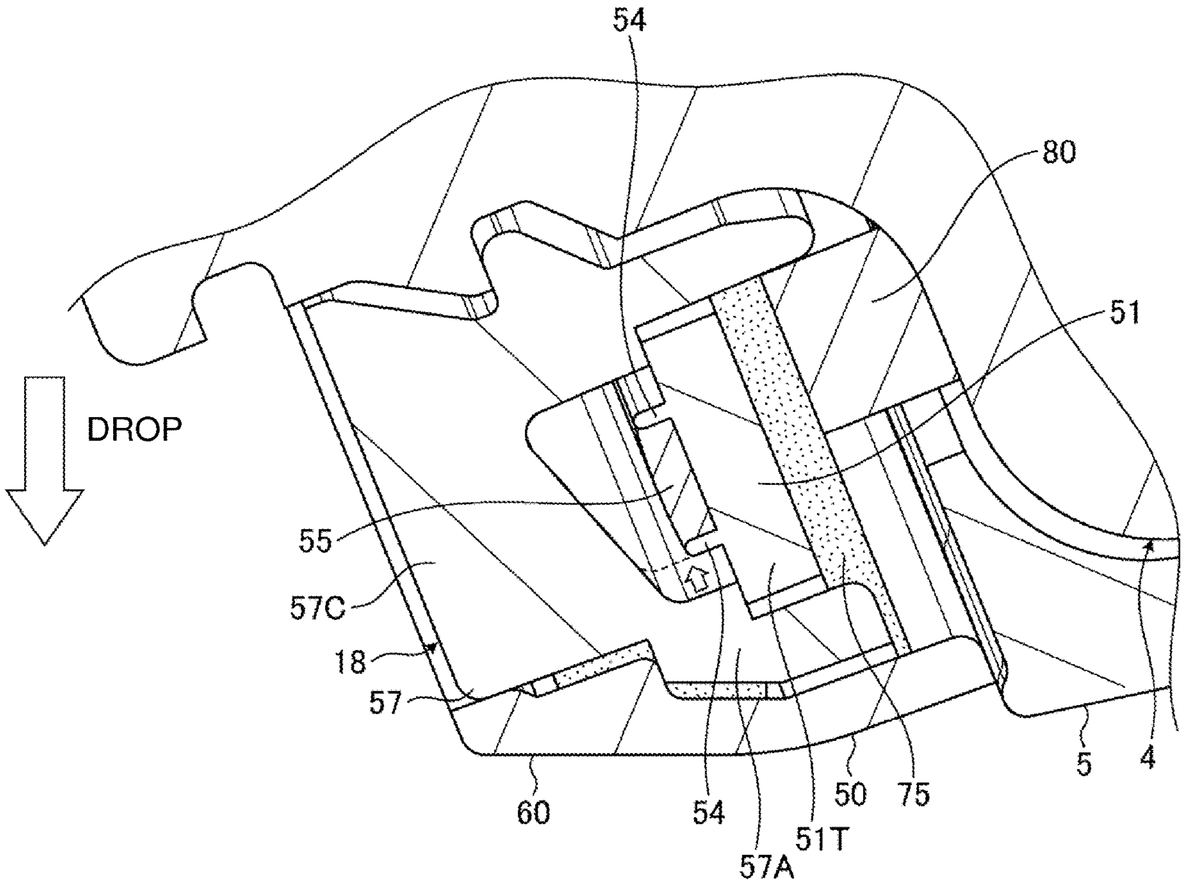
FIG. 13 is a schematic diagram of the electric work machine according to the embodiment that is falling.

FIG. 13 is a schematic diagram of the impact tool 1 according to the present embodiment that is falling. When the impact tool 1 falls and an upper portion of the light unit 18 hits the ground (floor), the light unit 18 receives a shock. As described above, the light unit 18 includes the banks 54 including one bank 54 located on the front surface of the ring portion 51A and radially inward from the LED chips 52 and the other bank 54 located on the front surface of the ring portion 51A and radially outward from the LED chips 52, the phosphor 55 covering the LED chips 52 between the banks 54, and the optical member 57 including the outer cylinder 57A located radially outward from the ring portion 51A and the light transmitter 57C located frontward from the LED chips 52 to allow light emitted from the LED chips 52 to pass through.

When the impact tool 1 falls, the apex 51T receives a shock. The banks 54 may thus receive the shock through the outer cylinder 57A in the optical member 57. The portions of the banks 54 at the apex 51T may deform or break. When an LED chip 52 is located at the apex 51T, the shock applied to the optical member 57 may be applied to the LED chip 52 through the banks 54. In the present embodiment, no LED chip 52 is located at the apex 51T. When the portions of the banks 54 at the apex 51T receive a shock and deform or break, the LED chips 52 are less likely to receive a shock. The LED chips 52 are thus less likely to break or separate from the substrate 51. The LED chips 52 are less likely to be unlighted. This reduces the likelihood of the light unit 18 having lower light emission performance.

The multiple LED chips 52 in the present embodiment are line symmetric to one another with respect to the straight line extending vertically and including the central axis (rotation axis AX) of the anvil 10 and the apex 51T.

This allows a workpiece to be processed with the impact tool 1 to be illuminated appropriately by the multiple LED chips 52.

The substrate 51 in the present embodiment includes the ring portion 51A surrounding the anvil 10. The multiple LED chips 52 are mounted on the front surface of the ring portion 51A.

This allows a workpiece to be processed with the impact tool 1 to be illuminated appropriately.

The multiple LED chips 52 in the present embodiment are at equal intervals circumferentially on the front surface of the ring portion 51A.

This allows a workpiece to be processed with the impact tool 1 to be illuminated appropriately.

The light unit 18 in the present embodiment includes the positive electrode 61A located on the substrate 51 to receive a positive voltage and the negative electrode 61B located on the substrate 51 to receive a negative voltage. Each LED chip 52 is connected in parallel to the positive electrode 61A and the negative electrode 61B.

For example, when one LED chip 52 breaks or is unlighted, the other LED chips 52 receive power. Thus, the other LED chips 52 are less likely to be unlighted.

The light unit 18 in the present embodiment includes the positive power lines 63A and the negative power lines 63B located on the substrate 51 and connected to the respective LED chips 52, and the resistors 59 located on at least the positive power lines 63A or the negative power lines 63B.

Thus, a voltage applied to the LED chips 52 is adjusted by the resistors 59. The resistors 59 allow, for example, the uniform luminance of the LED chips 52.

Each resistor 59 in the present embodiment is between a pair of LED chips 52 adjacent to each other on the front surface of the substrate 51.

This allows the LED chips 52 and the resistors 59 to be mounted appropriately on the front surface of the substrate 51.

One of the resistors 59 in the present embodiment is located at the apex 51T.

When, for example, the impact tool 1 falls and the apex 51T receives a shock, the resistors 59 are less likely to break than the LED chips 52. This reduces the likelihood of the light unit 18 having lower light emission performance.

In the present embodiment, the LED chips 52 and the resistors 59 alternate circumferentially on the front surface of the ring portion 51A.

This allows the LED chips 52 and the resistors 59 to be mounted appropriately on the front surface of the ring portion 51A.

Other Embodiments

Figure 14:
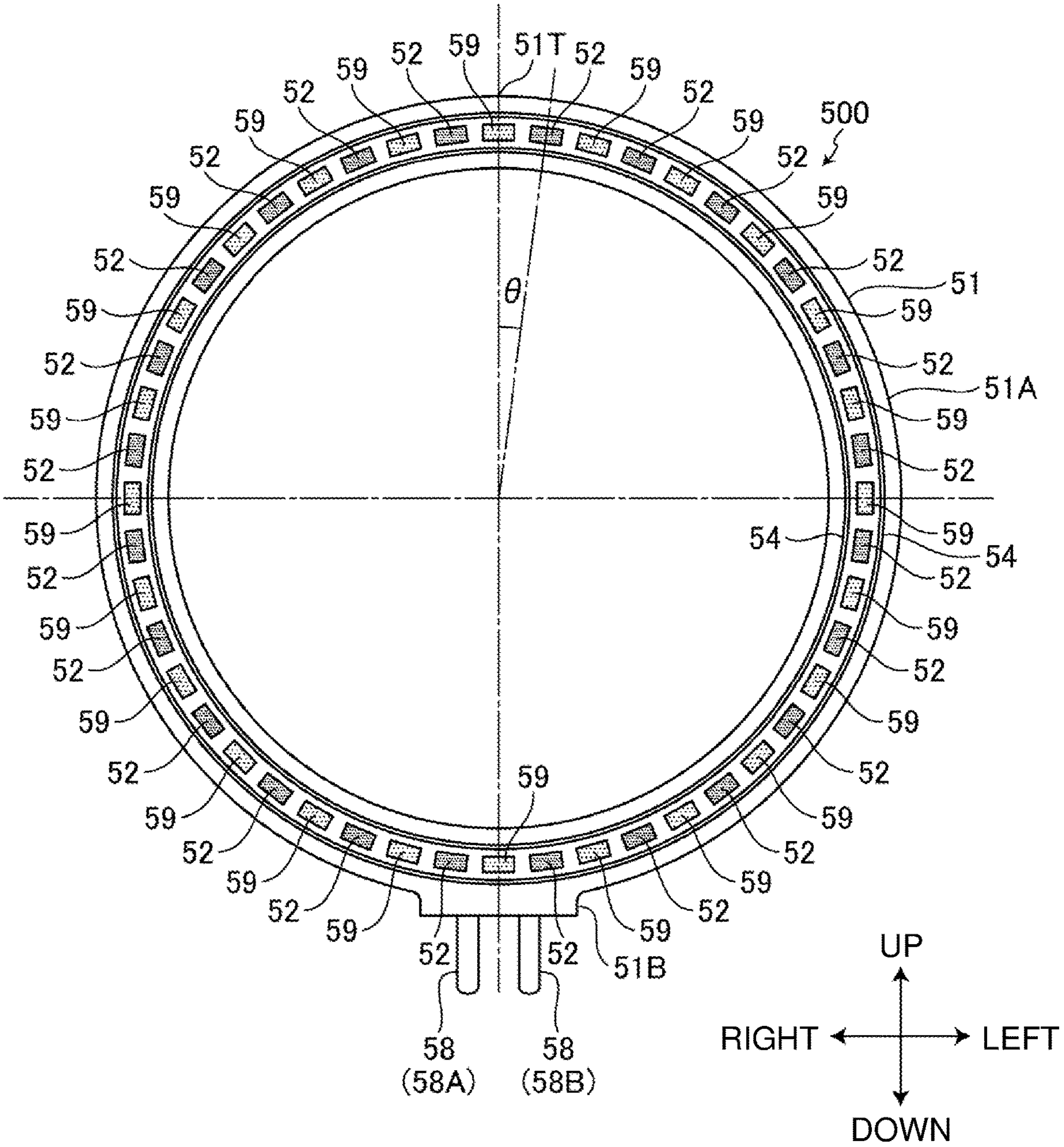
FIG. 14 is a front view of a substrate in a COB LED in another embodiment.

FIG. 14 is a front view of the substrate 51 in a COB LED 500 in another embodiment. In the above embodiment, the twelve LED chips 52 are arranged on the ring portion 51A of the substrate 51 at intervals. As shown in FIG. 14, twenty-four LED chips 52 may be arranged on the ring portion 51A of the substrate 51 at intervals. Twenty-four resistors 59 may be arranged on the ring portion 51A of the substrate 51 at intervals. The LED chips 52 and the resistors 59 alternate circumferentially on the front surface of the ring portion 51A.

Figure 15:
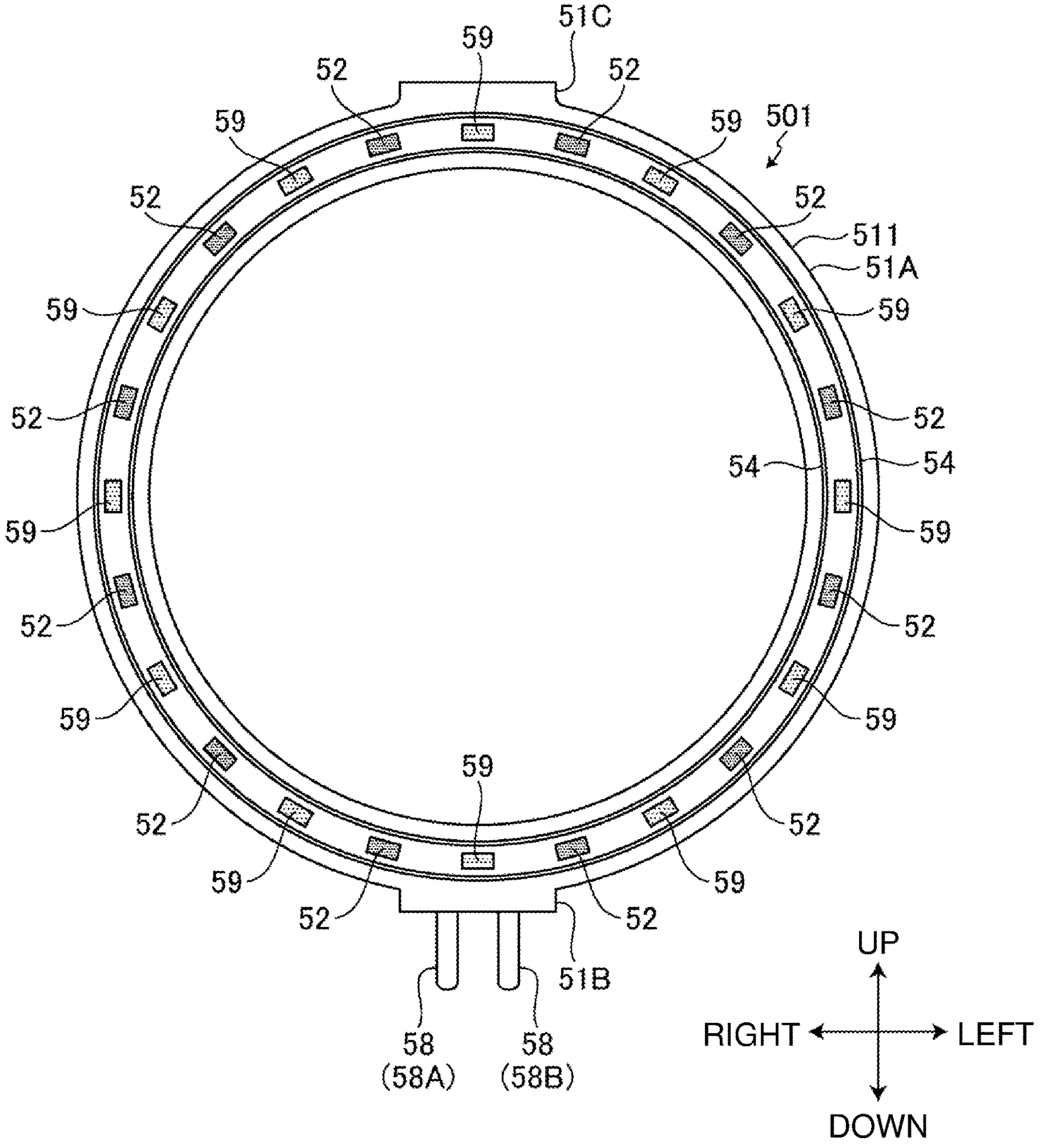
FIG. 15 is a front view of a substrate in a COB LED in another embodiment.

FIG. 15 is a front view of a substrate 511 in a COB LED 501 in another embodiment. As shown in FIG. 15, the substrate 511 includes a projection 51C protruding upward from an upper portion of the ring portion 51A. The projection 51C has a flat upper surface extending in the lateral direction.

When, for example, the impact tool 1 falls, the projection 51C reduces a shock on the apex of the ring portion 51A. In other words, the projection 51C serves as a buffer and thus reduces the likelihood of an excess shock being applied to the LED chips 52.

Figure 16:
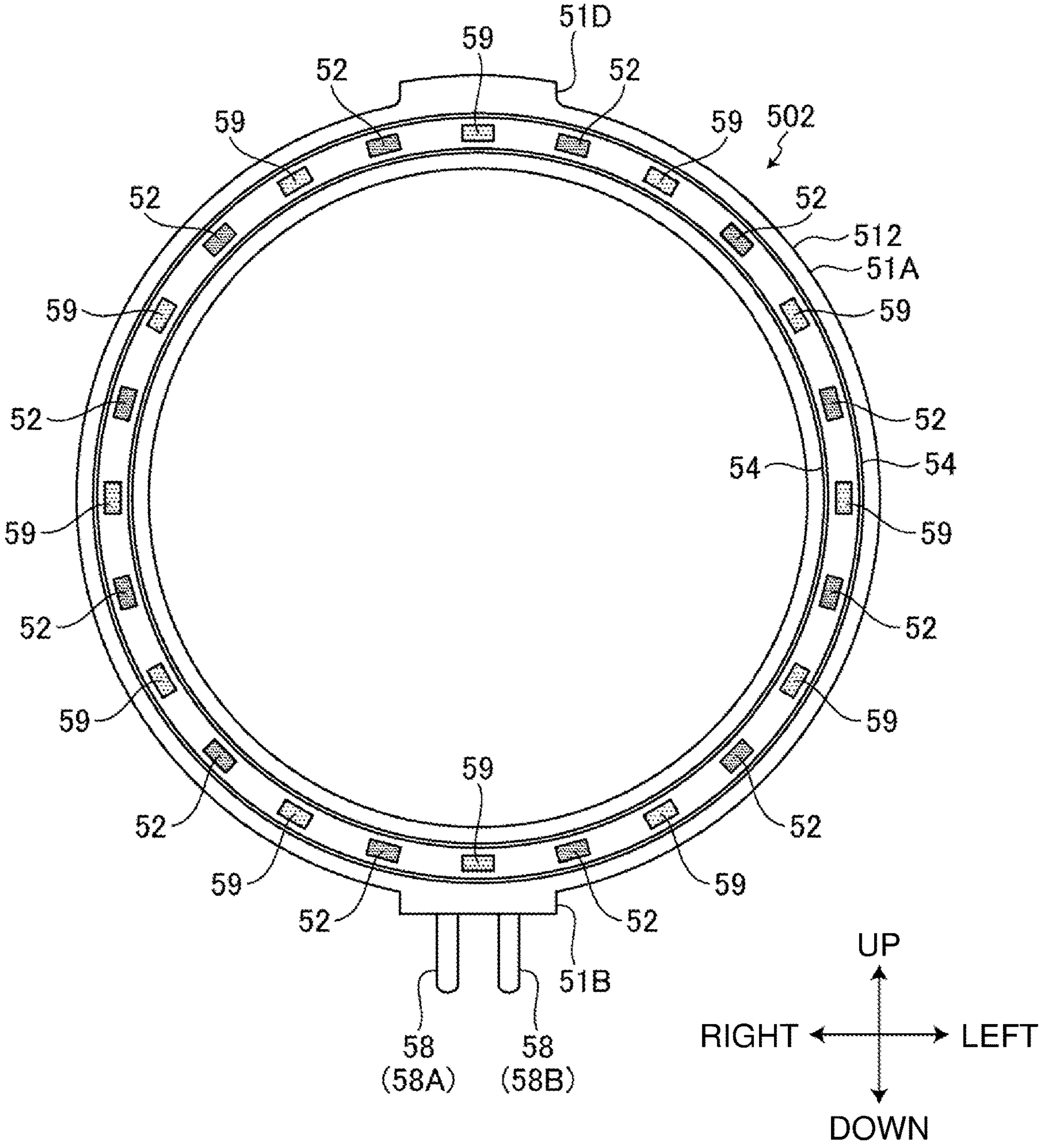
FIG. 16 is a front view of a substrate in a COB LED in another embodiment.

FIG. 16 is a front view of a substrate 512 in a COB LED 502 in another embodiment. As shown in FIG. 16, the substrate 512 includes a projection 51D protruding upward from the upper portion of the ring portion 51A. The projection 51D has a curved upper surface with its middle portion in the lateral direction protruding upward.

When, for example, the impact tool 1 falls, the projection 51D reduces a shock on the apex of the ring portion 51A. In other words, the projection 51D serves as a buffer and thus reduces the likelihood of an excess shock being applied to the LED chips 52.

Figure 17:
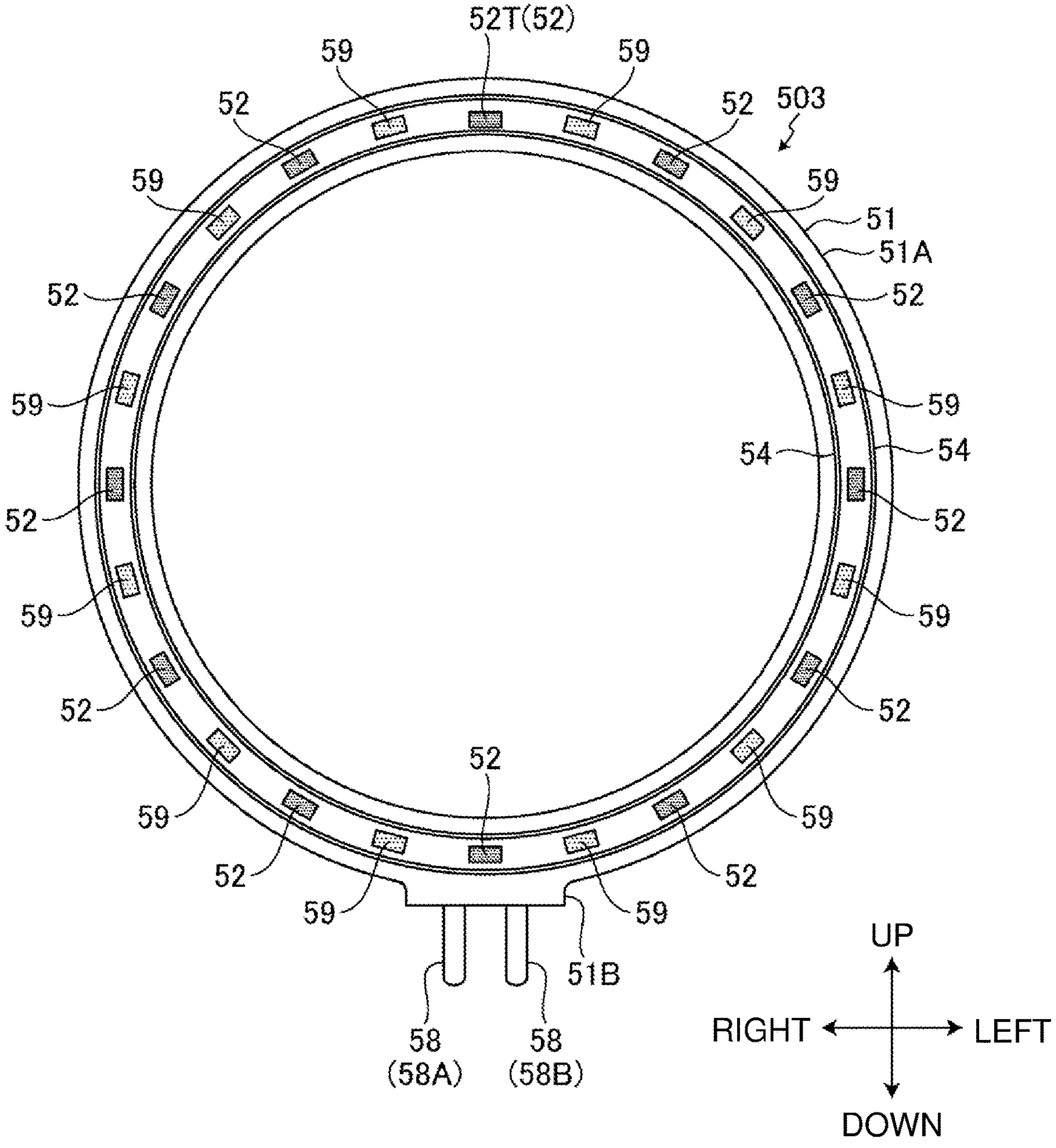
FIG. 17 is a front view of a substrate in a COB LED in another embodiment.

FIG. 17 is a front view of the substrate 51 in a COB LED 503 in another embodiment. In the example shown in FIG. 17, one LED chip 52T of the twelve LED chips 52 is located at the apex of the ring portion 51A. The LED chips 52 are at angular positions of 0, 30, 60, 90, 120, 150, 180, 210, 240, 270, 300, and 330° about the rotation axis AX. In the example shown in FIG. 17, the distance between the rotation axis AX (the center of the ring portion 51A) and the LED chip 52T is shorter than the distance between the rotation axis AX and each of the other LED chips 52 in the radial direction of the rotation axis AX. In other words, the LED chip 52T at the apex is located radially inward from the other LED chips 52.

When, for example, the impact tool 1 falls and the apex of the ring portion 51A receives a shock, the distance between the outer circumferential portion of the ring portion 51A and the LED chip 52T is long to reduce the likelihood of an excess shock being applied to the LED chip 52T.

In the above embodiment, the light shield 60 is formed from a polycarbonate resin containing a colored pigment. The light shield 60 may include a black coating applied on the surface of its polycarbonate resin member. The light shield 60 may be formed from rubber, an elastomer, or a metal.

In the above embodiment, the impact tool 1 is an impact driver. The impact tool 1 may be an impact wrench.

In the above embodiment, the electric work machine 1 is an impact tool as an example of a power tool. The power tool is not limited to an impact tool. Examples of the power tool include a driver drill, an angle drill, a screwdriver, a hammer, a hammer drill, a circular saw, and a reciprocating saw.

Figure 18:
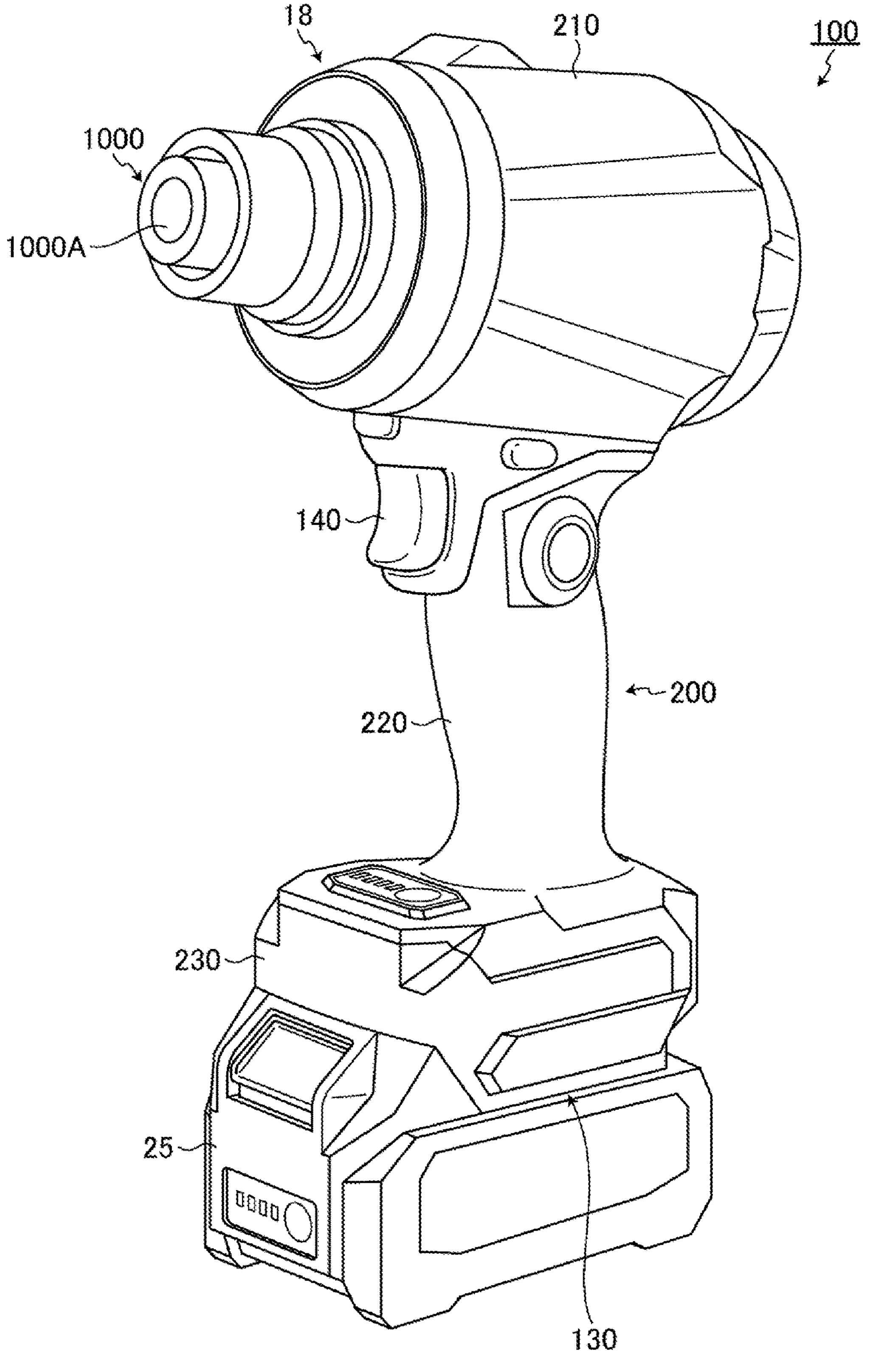
FIG. 18 is a perspective view of an electric work machine according to another embodiment as viewed from the front.

The electric work machine 1 may not be a power tool. FIG. 18 is a perspective view of an electric work machine 100 according to another embodiment as viewed from the front. The electric work machine 100 shown in FIG. 18 is an air duster. The electric work machine 100 includes a housing 200, a battery mount 130, a trigger switch 140, an output unit 1000, and the light unit 18. The housing 200 includes a motor compartment 210, a grip 220, and a battery holder 230. The grip 220 extends downward from a lower portion of the motor compartment 210. The battery holder 230 is connected to a lower portion of the grip 220. The motor compartment 210 accommodates a motor and a fan (not shown in FIG. 18). The trigger switch 140 is located on the grip 220. The battery mount 130 is located in a lower portion of the battery holder 230. The battery mount 130 receives the battery pack 25. The output unit 1000 operates with a rotational force from the motor. The output unit 1000 is located frontward from the front end of the motor compartment 210. As the motor rotates, the fan rotates, thus jetting air from a jet opening 1000A in the output unit 1000. The light unit 18 described in the above embodiment may surround the output unit 1000 in the electric work machine 100.

In the above embodiment, the electric work machine may use utility power (alternating current power supply) in place of the battery pack 25.

REFERENCE SIGNS LIST

1 electric work machine (impact tool)
2 housing
2L left housing
2R right housing
2S screw
3 rear cover
3S screw
4 hammer case
4A rear cylinder
4B front cylinder
4C annular portion
4D protrusion
4E rear surface
4F slope
5 case cover
6 motor
7 reducer
8 spindle
8A flange
8B spindle shaft
8C ring portion
8D spindle groove
9 striker
10 anvil (output unit)
10A tool hole
10B recess
10C anvil shaft
10D anvil projection
11 tool holder
12 fan
12A bush
13 battery mount
14 trigger lever
15 forward-reverse switch lever
16 hand mode switch button
16A circuit board
16B switch
18 light unit
19 inlet
20 outlet
21 motor compartment
22 grip
23 battery holder
24 bearing box
25 battery pack
26 stator
27 rotor
28 stator core
29 front insulator
29S screw
30 rear insulator
31 coil
32 rotor core
33 rotor shaft
34 rotor magnet
35 sensor magnet
37 sensor board
37A magnetic sensor
37B resin-molded body
38 fusing terminal
39 rotor bearing
40 rotor bearing
41 pinion gear
42 planetary gear
42P pin
43 internal gear
44 spindle bearing
45 washer
46 anvil bearing
47 hammer
47A hammer groove
47B hammer projection
47C recess
48 ball
49 coil spring
50 chip-on-board light-emitting diode (COB LED)
51 substrate
51A ring portion
51B support
51C projection
51D projection
51T apex
52 LED chip (light emitter)
54 bank
55 phosphor
57 optical member
57A outer cylinder
57B inner cylinder
57C light transmitter
57D protrusion
57E incident surface
57F emission surface
57K recess
57M rear slide
57N front slide
57P front surface
57Q slope
57T facing surface
57V groove
57W groove
58 lead wire
58A positive lead wire
58B negative lead wire
59 resistor
60 light shield
60A cylinder
60B protrusion
60C abutment surface
60D groove
60E groove
60F front end
60G protrusion
61A positive electrode
61B negative electrode
62A positive relay line
62B negative relay line
63A positive power line
63B negative power line
70 first adhesive
75 second adhesive
80 sponge ring
90 tip tool
100 electric work machine
130 battery mount
140 trigger switch 200 housing
210 motor compartment
220 grip
230 battery holder
500 COB LED
501 COB LED
502 COB LED
503 COB LED
511 substrate
512 substrate
1000 output unit
1000A jet opening
AX rotation axis

What is claimed is:

1. An electric work machine, comprising:
a motor;
a housing including
a motor compartment accommodating the motor, and
a grip protruding downward from the motor compartment;
an output unit located frontward from the motor and operable with a rotational force from the motor;
a substrate extending above, on a left, and on a right of the output unit; and
a plurality of light emitters mounted on a front surface of the substrate at intervals in a circumferential direction of the output unit;
power lines located on the substrate and connected to the respective plurality of light emitters; and
resistors located on the power lines,
wherein a light emitter of the plurality of light emitters nearest an apex of the substrate immediately above the output unit is at a position shifted circumferentially by a predetermined angle from the apex,
each resistor is between a pair of light emitters of the plurality of light emitters adjacent to each other on the front surface of the substrate, and
one of the resistors is located at the apex.

2. The electric work machine according to claim 1, wherein
the substrate includes a ring portion surrounding the output unit, and
the plurality of light emitters are mounted on a front surface of the ring portion.

3. The electric work machine according to claim 2, wherein
the plurality of light emitters are at equal intervals circumferentially on the front surface of the ring portion.

4. The electric work machine according to claim 3, wherein
the substrate includes a projection protruding upward from an upper portion of the ring portion.

5. The electric work machine according to claim 2, further comprising:
a bank located on the front surface of the ring portion and radially inward from the plurality of light emitters and a bank located on the front surface of the ring portion and radially outward from the plurality of light emitters;
a phosphor covering the plurality of light emitters between the banks; and
an optical member including
an outer cylinder located radially outward from the ring portion, and
a light transmitter located frontward from the plurality of light emitters, the light transmitter being configured to allow light emitted from the plurality of light emitters to pass through.

6. The electric work machine according to claim 5, wherein
the substrate includes a projection protruding upward from an upper portion of the ring portion.

7. The electric work machine according to claim 2, wherein
the substrate includes a projection protruding upward from an upper portion of the ring portion.

8. The electric work machine according to claim 1, wherein
the plurality of light emitters are line symmetric to one another with respect to a straight line extending vertically and including a central axis of the output unit and the apex.

9. The electric work machine according to claim 8, wherein
the substrate includes a ring portion surrounding the output unit, and
the plurality of light emitters are mounted on a front surface of the ring portion.

10. The electric work machine according to claim 8, wherein
the substrate includes a projection protruding upward from an upper portion of the ring portion.

11. The electric work machine according to claim 1, wherein
the substrate includes a projection protruding upward from an upper portion of the ring portion.

12. The electric work machine according to claim 11, wherein
the projection has a flat upper surface extending in a lateral direction.

13. The electric work machine according to claim 11, wherein
the projection has a curved upper surface with a middle portion of the projection in a lateral direction protruding upward.

14. The electric work machine according to claim 1, further comprising:
a positive electrode located on the substrate to receive a positive voltage; and
a negative electrode located on the substrate to receive a negative voltage,
wherein each of the plurality of light emitters is connected in parallel to the positive electrode and the negative electrode.

15. The electric work machine according to claim 1, wherein
the substrate includes a ring portion surrounding the output unit, and
the plurality of light emitters and the resistors alternate circumferentially on a front surface of the ring portion.

16. The electric work machine according to claim 1, wherein
the output unit includes an anvil strikable by a hammer in a rotation direction.

17. An electric work machine, comprising:
a motor including
a stator, and
a rotor rotatable relative to the stator;
a housing including
a motor compartment accommodating the motor, and
a grip extending vertically;

a forward-reverse switch lever operable to switch a rotation direction of the motor between forward and reverse;
a trigger lever located in an upper portion of the grip and operable to switch the motor between a driving state and a stopped state;
a pinion gear rotatable by the rotor;
a reducer connected to the pinion gear;
an output unit operable with the reducer;
a substrate located at least above the output unit; and
a plurality of light emitters mounted on a front surface of the substrate at intervals in a circumferential direction of the output unit;
power lines located on the substrate and connected to the respective plurality of light emitters; and
resistors located on the power lines,
wherein a light emitter of the plurality of light emitters nearest an apex of the substrate immediately above the output unit is at a position shifted circumferentially by a predetermined angle from the apex,
each resistor is between a pair of light emitters of the plurality of light emitters adjacent to each other on the front surface of the substrate, and
one of the resistors is located at the apex.

* * * * *